(12) United States Patent
Hendry et al.

(10) Patent No.: US 10,798,417 B2
(45) Date of Patent: Oct. 6, 2020

(54) DEBLOCK FILTERING FOR 360-DEGREE VIDEO CODING

(71) Applicant: QUALCOMM Incorporated, San Diego, CA (US)

(72) Inventors: Fnu Hendry, San Diego, CA (US); Geert Van der Auwera, Del Mar, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 16/026,350

(22) Filed: Jul. 3, 2018

(65) Prior Publication Data

US 2019/0014347 A1 Jan. 10, 2019

Related U.S. Application Data

(60) Provisional application No. 62/608,395, filed on Dec. 20, 2017, provisional application No. 62/528,938, filed on Jul. 5, 2017.

(51) Int. Cl.
| | |
|---|---|
| *H04N 19/597* | (2014.01) |
| *H04N 19/86* | (2014.01) |
| *H04N 19/117* | (2014.01) |
| *H04N 19/82* | (2014.01) |
| *H04N 19/176* | (2014.01) |
| *H04N 19/167* | (2014.01) |

(52) U.S. Cl.
CPC ......... *H04N 19/597* (2014.11); *H04N 19/117* (2014.11); *H04N 19/167* (2014.11); *H04N 19/176* (2014.11); *H04N 19/82* (2014.11); *H04N 19/86* (2014.11)

(58) Field of Classification Search
CPC .. H04N 19/597; H04N 19/117; H04N 19/167; H04N 19/176; H04N 19/82; H04N 19/86
USPC ...................................... 375/240.02
See application file for complete search history.

(56) References Cited

U.S. PATENT DOCUMENTS

| | | | |
|---|---|---|---|
| 2017/0085917 A1 | 3/2017 | Hannuksela | |
| 2018/0242016 A1* | 8/2018 | Lee ...................... | H04N 19/597 |
| 2019/0007684 A1* | 1/2019 | Van Der Auwera ... | H04N 19/82 |

FOREIGN PATENT DOCUMENTS

| | | |
|---|---|---|
| WO | 2016064862 A1 | 4/2016 |
| WO | 2016076680 A1 | 5/2016 |

(Continued)

OTHER PUBLICATIONS

International Search Report and Written Opinion—PCT/US2018/040897—ISA/EPO—dated Oct. 5, 2018.

(Continued)

*Primary Examiner* — William C Vaughn, Jr.
*Assistant Examiner* — Jae N Noh
(74) *Attorney, Agent, or Firm* — Shumaker & Sieffert, P.A.

(57) ABSTRACT

A method of decoding 360-degree video, including receiving video data indicative of a 360-degree video picture projected onto a 2D picture, the 2D picture being divided into a plurality of blocks, predicting a first of the blocks of the 2D picture, and deblock filtering pixels along a border of the first of the blocks based on the position of the border between the first of the blocks and a second of the blocks in the 360-degree video picture.

12 Claims, 26 Drawing Sheets

(56) References Cited

FOREIGN PATENT DOCUMENTS

| WO | 2018010688 A1 | 1/2018 |
|---|---|---|
| WO | 2018156281 A1 | 8/2018 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Chen Y., et al., "Description of SDR, HDR and 360 Degree Video Coding Technology Proposal by Qualcomm and Technicolor—Low and High Complexity Versions," JVET-J0021, 10th Meeting; San Diego, US, Apr. 10-20, 2018 (The Joint Video Exploration Team of ISO/IEC JTC1/SC29/WG11 and ITU-T SG.16); URL: http://phenix.int-evry.fr/jvet/, pp. 1-43.

* cited by examiner

VISUAL ARTIFACT AT THE BACK OF ERP

VISUAL ARTIFACT AT THE POLE OF ERP

| $Q0_0$ | $Q0_1$ | $Q0_2$ | $Q0_3$ |
|---|---|---|---|
| $Q1_0$ | $Q1_1$ | $Q1_2$ | $Q1_3$ |
| $Q2_0$ | $Q2_1$ | $Q2_2$ | $Q2_3$ |
| $Q3_0$ | $Q3_1$ | $Q3_2$ | $Q3_3$ |

302

⋮

| $P3_0$ | $P3_1$ | $P3_2$ | $P3_3$ |
|---|---|---|---|
| $P2_0$ | $P2_1$ | $P2_2$ | $P2_3$ |
| $P1_0$ | $P1_1$ | $P1_2$ | $P1_3$ |
| $P0_0$ | $P0_1$ | $P0_2$ | $P0_3$ |

| $Q0_3$ | $Q0_2$ | $Q0_1$ | $Q0_0$ |
|---|---|---|---|
| $Q1_3$ | $Q1_2$ | $Q1_1$ | $Q1_0$ |
| $Q2_3$ | $Q2_2$ | $Q2_1$ | $Q2_0$ |
| $Q3_3$ | $Q3_2$ | $Q3_1$ | $Q3_0$ |

— 306

⋮

— 304

| $P3_3$ | $P3_2$ | $P3_1$ | $P3_0$ |
|---|---|---|---|
| $P2_3$ | $P2_2$ | $P2_1$ | $P2_0$ |
| $P1_3$ | $P1_2$ | $P1_1$ | $P1_0$ |
| $P0_3$ | $P0_2$ | $P0_1$ | $P0_0$ |

FIG. 15

|  312 |  |  |  |
| --- | --- | --- | --- |
| $P0_0$ | $P1_0$ | $P2_0$ | $P3_0$ |
| $P0_1$ | $P1_1$ | $P2_1$ | $P3_1$ |
| $P0_2$ | $P1_2$ | $P2_2$ | $P3_2$ |
| $P0_3$ | $P1_3$ | $P2_3$ | $P3_3$ |

⋮

|  314 |  |  |  |
| --- | --- | --- | --- |
| $Q0_3$ | $Q1_1$ | $Q2_2$ | $Q3_3$ |
| $Q0_2$ | $Q1_1$ | $Q2_2$ | $Q3_3$ |
| $Q0_1$ | $Q1_1$ | $Q2_2$ | $Q3_3$ |
| $Q0_0$ | $Q1_1$ | $Q2_2$ | $Q3_3$ |

FIG. 17

DEBLOCK FILTERING FOR 360-DEGREE VIDEO CODING

This application claims the benefit of U.S. Provisional Application No. 62/528,938, filed Jul. 5, 2017, and U.S. Provisional Application No. 62/608,395, filed Dec. 20, 2017, the entire content of each of which is incorporated by reference herein.

TECHNICAL FIELD

This disclosure relates to encoding and decoding video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, also referred to as High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

In block-based video coding systems, such as the above, visually apparent artifacts can occur at the boundary between coded blocks. Older systems applied post-filters to reduce such artifacts after decoding. Coding systems, such as AVC and HEVC, include in-loop deblock filters. In an in-loop deblock filter, the filtered blocks are used to predict inter-predicted blocks of other pictures (in other words, decoded pictures are placed in the decoded picture buffer of the encoder/decoder after deblock filtering is applied). In HEVC, for example, deblocking is performed on pixels near the block boundary based on certain criteria: 1) the block boundary is a prediction unit or transform unit boundary; 2) a boundary strength metric is greater than zero; and 3) a metric indicative of the variation of signal on both sides of a block boundary is below a specified threshold. Strong or weak filtering decisions may also be performed based on local signal criteria near the boundary. A "strong" filter is one that affects more pixels along the boundary than a "normal" filter.

More recently, techniques for coding and transmitting 360-degree video (e.g., for VR applications) have been developed. As a result of recent developments in VR video technology, the video environment experienced by the user has become just as important as the subject of the videos themselves. Such VR video technology may use 360-degree video technology that involves real-time streaming of 360-degree video graphics and/or real-time streaming of 360-degree video from a 360-degree video camera or website to a real-time video display, such as a VR head-mount display (HMD). A VR HMD allows the user to experience action happening all around them by changing a viewing angle with a turn of the head. In order to create a 360-degree video, a special set of cameras may be used to record all 360-degrees of a scene simultaneously, or multiple views (e.g., video and/or computer-generated images) may be stitched together to form the image.

After video data has been encoded, the video data may be packetized for transmission or storage. The video data may be assembled into a video file conforming to any of a variety of standards, such as the International Organization for Standardization (ISO) base media file format and extensions thereof, such as the AVC file format.

SUMMARY

In general, this disclosure is directed to techniques for encoding and decoding video data. In some examples, this disclosure describes techniques for applying a deblock filter to 360-degree video data produced with a projection, such as an equirectangular projection (ERP), cubemap projection (CMP), and/or adjusted cubemap projection (ACP). In some examples, 360-degree video data may be packed into a frame after projection. The packed video data may not be continuous across the entirety of the packed frame, thus causing problems when attempting to apply filtering techniques, such as deblocking filtering. Example techniques of this disclosure may exploit pixel continuity at the picture border and cube face borders to improve deblocking performance.

In one example, this disclosure describes a method of decoding 360-degree video, the method comprising receiving video data indicative of a 360-degree video picture projected onto a 2D picture, the 2D picture being divided into a plurality of blocks, predicting a first of the blocks of the 2D picture, and deblock filtering pixels along a border of the first of the blocks based on the position of the border between the first of the blocks and a second of the blocks in the 360-degree video picture.

In another example, this disclosure describes an apparatus configured to decode 360-degree video, the apparatus comprising a memory configured to store the 360-degree video, and one or more processors in communication with the memory, the one or more processors configured to receive video data indicative of the 360-degree video picture projected onto a 2D picture, the 2D picture being divided into a plurality of blocks, predict a first of the blocks of the 2D picture, and deblock filter pixels along a border of the first of the blocks based on the position of the border between the first of the blocks and a second of the blocks in the 360-degree video picture.

In another example, this disclosure describes a method of encoding 360-degree video, comprising projecting a 360-degree video picture onto a 2D picture, dividing the 2D picture into a plurality of blocks, predicting a first of the blocks of the 2D picture, and deblock filtering pixels along a border of the first of the blocks based on the position of the border between the first of the blocks and a second of the blocks in the 360-degree video picture.

In another example, this disclosure describes a non-transitory computer-readable storage medium storing instructions that, when executed, causes one or more processors of a device configured to decode video data to receive video data indicative of a 360-degree video picture projected onto a 2D picture, the 2D picture being divided into a plurality of blocks, predict a first of the blocks of the 2D picture, and deblock filter pixels along a border of the first of the blocks based on the position of the border between the first of the blocks and a second of the blocks in the 360-degree video picture.

The details of one or more examples are set forth in the accompanying drawings and the description below. Other features, objects, and advantages will be apparent from the description and drawings, and from the claims.

BRIEF DESCRIPTION OF DRAWINGS

FIG. 14 illustrates an example pixel pairing between block P and block Q for along the top border of 360-degree video data with an equirectangular projection.

FIG. 15 illustrates an example pixel pairing between block P and block Q for along the bottom border of 360-degree video data with an equirectangular projection.

FIG. 17 illustrates an example pixel pairing between block P and block Q for along the right border of 360-degree video data with an equirectangular projection.

DETAILED DESCRIPTION

In general, this disclosure is directed to techniques for encoding and decoding video data. In some examples, this disclosure describes techniques for applying a deblock filter to 360-degree video data produced with a projection, such as an equirectangular projection (ERP), cubemap projection (CMP), and/or adjusted cubemap projection (ACP). In some examples, 360-degree video data may be packed into a frame after projection. The packed video data may not be continuous across the entirety of the packed frame, thus causing problems when attempting to apply filtering techniques, such as deblocking filtering. Example techniques of this disclosure may exploit pixel continuity at the picture border and cube face borders to improve deblocking performance.

Figure 1:
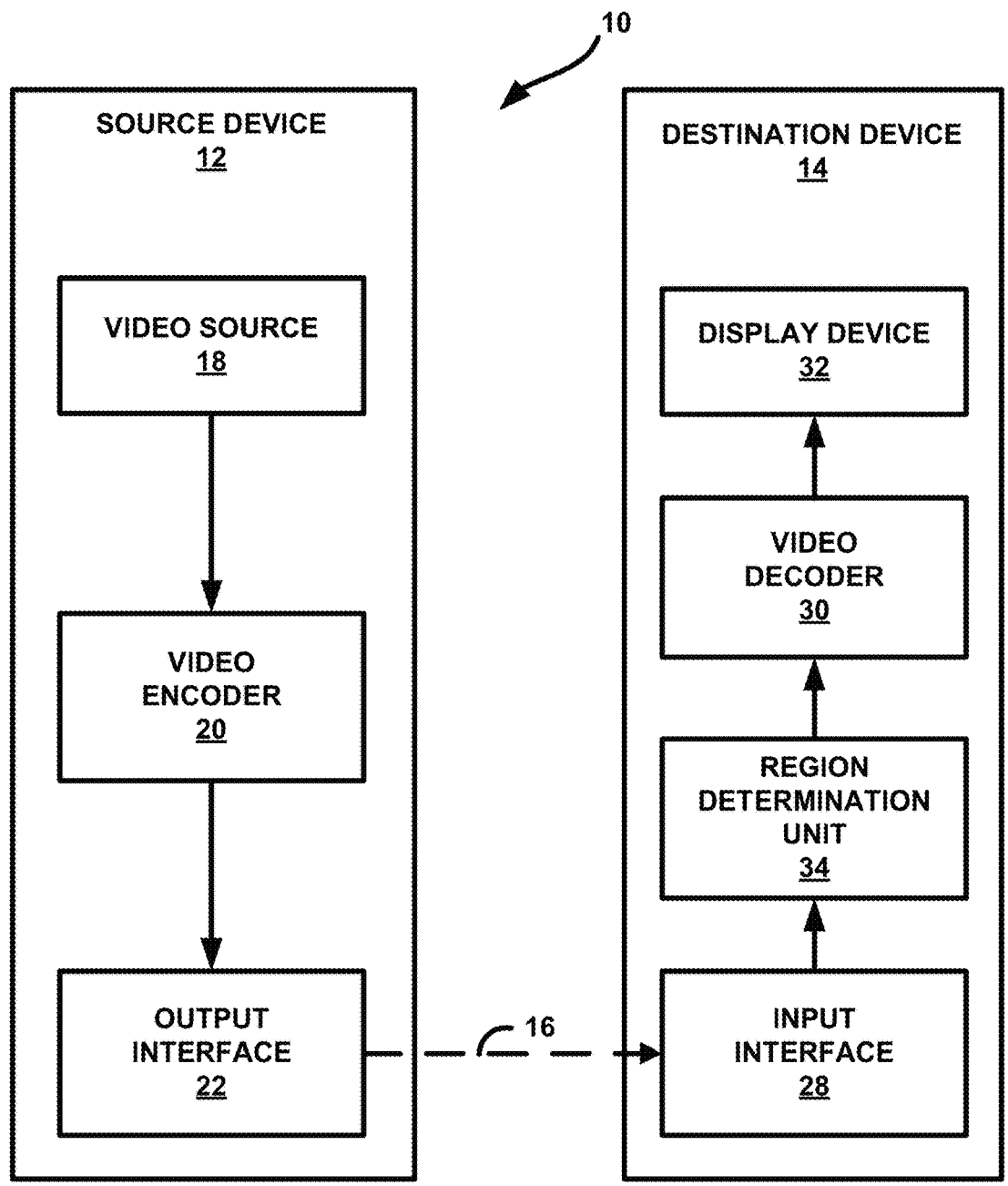
FIG. 1 is a block diagram illustrating an example video encoding and decoding system configured to perform the techniques of this disclosure.

FIG. 1 is a block diagram illustrating an example video encoding and decoding system 10 that may utilize techniques for deblock filtering for 360-degree video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure for deblock filtering for 360-degree video data are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, display device 32, and region determination unit 34. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for deblock filtering for 360-degree video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

In examples of this disclosure, video source 18 may be configured to capture 360-degree video data. For example, video source 18 may be a camera set, which typically consists of multiple individual cameras pointing to different directions and ideally collectively covering all viewpoints around the camera set. Video source 18 may be further configured to perform image stitching where video pictures taken by the multiple individual cameras are synchronized in the time domain and stitched in the space domain, to be a spherical video, but mapped to a rectangular format, such as an equirectangular map (like a world map) or cube map.

In one example, video encoder 20 may encode data for the full 360-degree panorama at multiple resolutions, e.g., 6 k, 4 k, HD (1080p), and 720p. That is, video encoder 20 may encode video data for each region (or "tile") at each of these multiple resolutions. In this manner, tile granularity may be the same for each resolution. Video encoder 20 may avoid inter-layer dependency when encoding the various resolutions. Thus, video decoder 30 may decode video data for the tiles at different resolutions in a selective manner (e.g., as selected by region determination unit 34). For example, region determination unit 34 may select a highest available resolution for regions at a center of the user's current viewpoint. Moving away from the center of the current viewpoint, the decoded resolution may drop gradually. That is, region determination unit 34 may select resolutions that get proportionally lower for regions (tiles) that are further from the center of the current viewpoint. Thus, video decoder 30 may decode video data at the lowest available resolution for tiles behind the user's current viewpoint.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In accordance with example techniques of this disclosure, output interface 22 and input interface 28 may correspond to network interfaces, such as network interface cards (NICs) implementing one or more network protocols, such as Ethernet. Computer-readable medium 16 may correspond to a network connection, which may traverse a private or public network, such as the Internet.

Display device 32 may correspond to a panoramic display. For example, display device 32 may correspond to a head-mounted display (HMD) or one or more screens that substantially or fully envelop a user. Region determination unit 34 may be configured to determine a plurality of regions of display device 32. For example, display device 32 may include a plurality of tiles, e.g., one or more portions of cube faces corresponding to a spherical display (or display that can simulate a spherical display, such as an HMD).

Region determination unit 34 may determine one or more of the regions at which a visual focus of the user (not shown in FIG. 1) is directed. Region determination unit 34 may cause input interface 28 to retrieve video data for a first subset of regions of display device 32 at which a visual focus of a user is directed.

Destination device 14 may include a memory configured to store retrieved video data, such as a hard disk and/or a buffer. Such memory may be included within video decoder 30, region determination unit 34, or elsewhere within destination device 14.

Video encoder 20 and video decoder 30 may operate according to a video coding standard, such as the High Efficiency Video Coding (HEVC) standard, also referred to as ITU-T H.265, or the new H.266 standard being studied by the Joint Video Experts Team (WET). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP). In general, video decoder 30 performs a substantially similar, albeit reciprocal, process to that performed by video encoder 20 to decode encoded data.

Video encoder 20 and video decoder 30 each may be implemented as any of a variety of suitable encoder or decoder circuitry, e.g., including one or more processors, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Hence, an encoder or decoder may be formed by any of a variety of integrated processing circuitry comprising one or more processors implemented as fixed hardware processing circuitry, programmable processing circuitry and/or a combination of both fixed and programmable processing circuitry. Each of video encoder 20 and video decoder 30 may be included in one or more encoders or decoders, either of which may be integrated as part of a combined encoder/decoder (CODEC) in a respective device. A device including video encoder 20, video decoder 30, and/or region determination unit 34 may comprise an integrated circuit, a microprocessor, and/or a wireless communication device, such as a cellular telephone.

The following describes various video coding techniques with reference to the HEVC standard. However, the techniques of this disclosure for deblock filtering for 360-degree video data may be used with any video coding techniques used with 360-degree video, including future video coding standards, such as H.266.

In HEVC and other video coding specifications, a video sequence typically includes a series of pictures. Pictures may also be referred to as "frames." A picture, including a frame or sphere of 360-degree video data, may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into 2 or 4 prediction units (PUs) or become just one PU when further partition does not apply. When two PUs are present in one CU, they can be half size rectangles or two rectangle size with ¼ or ¾ size of the CU.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra-prediction or inter-prediction to generate the predictive blocks for a PU. If video encoder 20 uses intra-prediction to generate the predictive blocks of a PU, video encoder 20 may generate the predictive blocks of the PU based on decoded samples of the picture associated with the PU. If video encoder 20 uses inter-prediction to generate the predictive blocks of a PU, video encoder 20 may generate the predictive blocks of the PU based on decoded samples of one or more pictures other than the picture associated with the PU. When the CU is inter coded, one set of motion information may be present for each PU. In addition, each PU may be coded with a unique inter-prediction mode to derive the set of motion information.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Figure 2A:
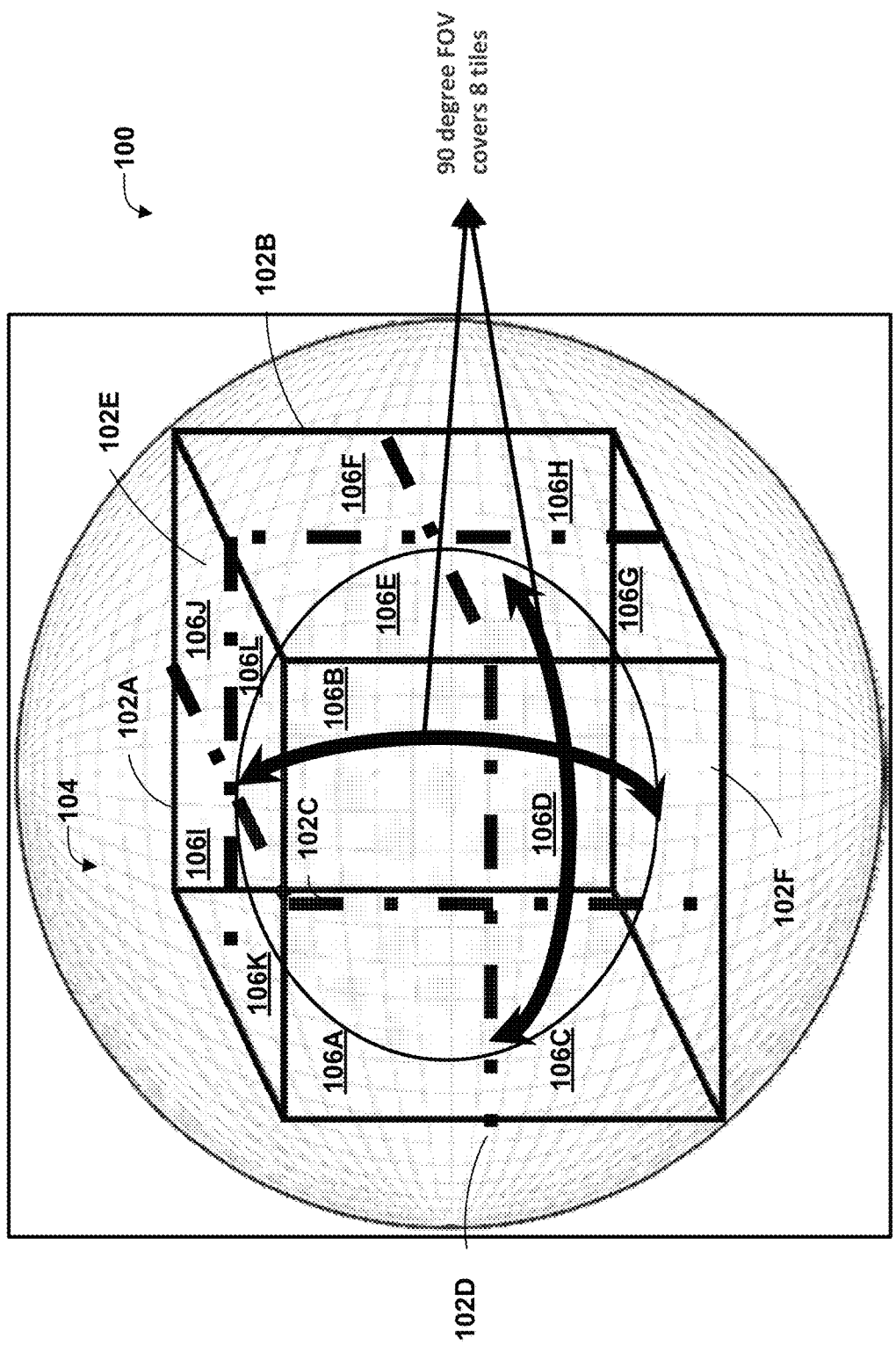
FIGS. 2A and 2B are conceptual diagrams illustrating representations of models for displays used to present 360-degree and/or panoramic video data.
Figure 2B:
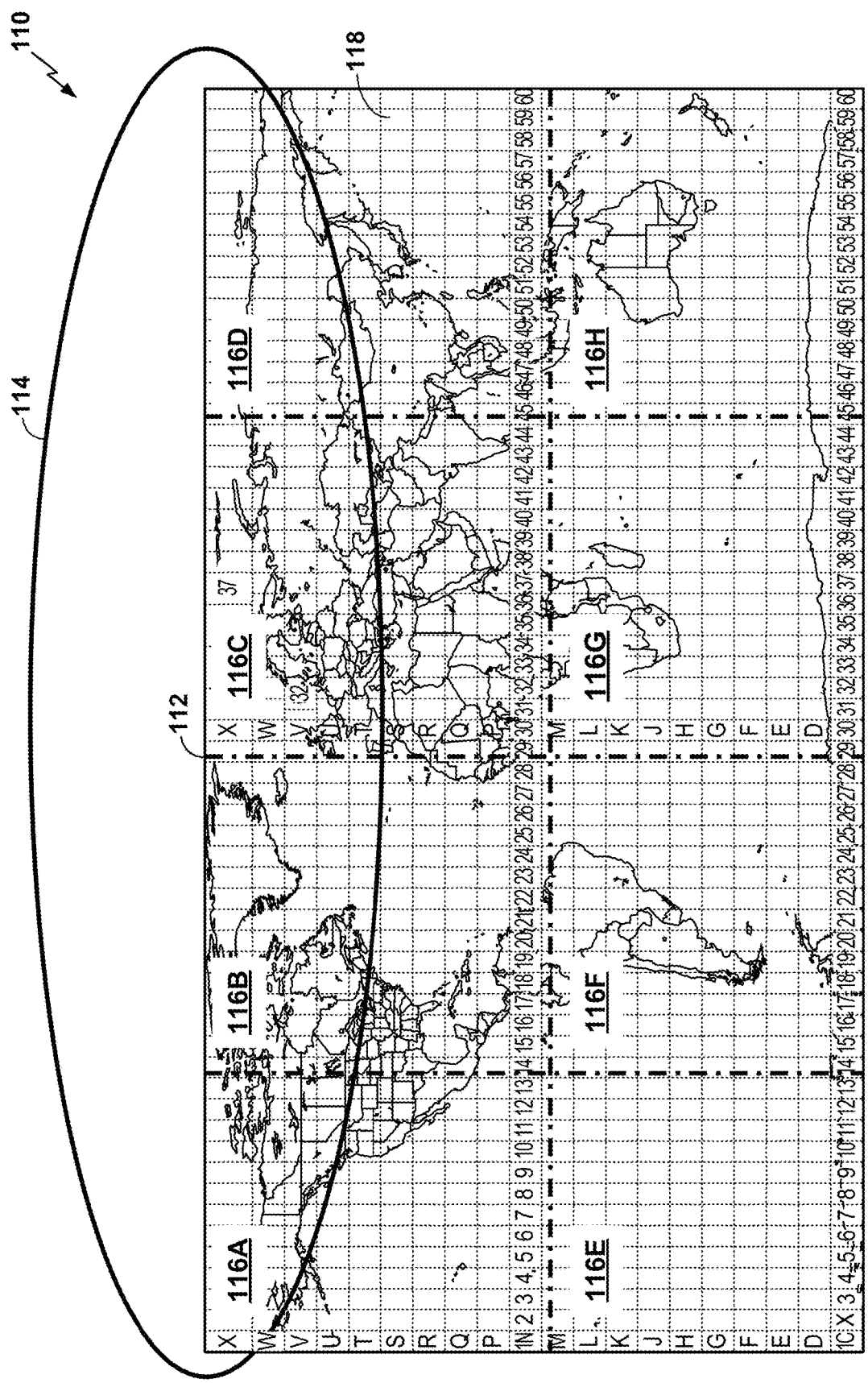

FIGS. 2A and 2B are conceptual diagrams illustrating representations of models for displays used to present panoramic and/or 360-degree video data. FIG. 2A illustrates an example of a cubemap projection (CMP) 100, while FIG. 2B illustrates equirectangular projection (ERP) 110.

In FIG. 2A, each of 6 faces 102A-102F (faces 102) of cube 104 is divided into four tiles (for a total of 24 tiles). However, in some examples, each of the faces may include only one tile. Tiles of visible faces (i.e., faces 102A, 102B, and 102C) are labeled as tiles 106A-106L. In particular, face 102C is divided into tiles 106A-106D, face 102B is divided into tiles 106E-106H, and face 102A is divided into tiles 106I-106L. The tiles of the hidden faces (i.e., faces 102D, 102E, and 102F) are unlabeled in FIG. 2A for purposes of readability, but it should be understood that faces 102D-102F are also divided into tiles. "Tiles" may also be referred to as regions. Each of cube faces 102 in FIG. 2A corresponds to a 90-degree by 90-degree field of view (FoV). Any arbitrary 90×90 degree tile of the sphere may require decoding of $\frac{1}{3}^{rd}$ of the panorama at high resolution. The FoV rarely spans more than eight tiles. Thus, the span of high resolution decoding can be restricted to eight tiles or less, without losing visual quality.

FIG. 2B illustrates canvas 118, which is divided into eight tiles 116A-116H. In this example, when a user is looking at the "poles" of the sphere (e.g., north pole 112, where the user's field of view when looking at north pole 112 is represented by area 114), the entire upper half of canvas 118 (i.e., tiles 116A-116D) would need to be decoded at high resolution. Breaking tiles 116A-116D up into more vertical tiles would not help to solve the problem. Thus, in this example, half of the panorama would need to be decoded at high resolution.

As discussed above, projections and mappings may be used to represent 3D surfaces (e.g., a sphere of 360-degree video) on 2D maps (e.g., a frame or picture of video data that may be coded). For example, for 360-degree video applications, projections are used to map 360-degree video data represented on a sphere onto a two-dimensional video frame. In general, video encoder 20 and/or source device 12 may use a cubemap projection to map points on the surface of the sphere of 360-degree video to points onto planes (e.g., faces of a cube) that are tangential to the sphere surface, e.g., as shown in FIG. 2A. The resulting cube may be mapped to a 2D frame by packing the video data using various packing schemes. Video encoder 20 and/or source device 12 may also use an equirectangular projection to map points on the source of the sphere of 360-degree video to points on a 2D plane, e.g., as shown in FIG. 2B. While this disclosure discuses projections of spherical 360-degree video onto six faces of a cube or using an equirectangular projection, it should be understood that the techniques of this disclosure may be used with other types of projections, including other cube-based projections as well as projections to other shapes.

In some examples of the disclosure, video encoder 20 may be configured to generate and signal one or more syntax elements in the encoded video bitstream that indicate the type of projection used. Video decoder 30 may be configured to receive and parse the one or more syntax elements to determine the projection. In other examples, the projection to use may be predetermined and stored at both video encoder 20 and video decoder 30. Video decoder 30 may be configured to use the same projection as video encoder 20 to reconstruct a sphere of 360-degree video data.

Figure 3:
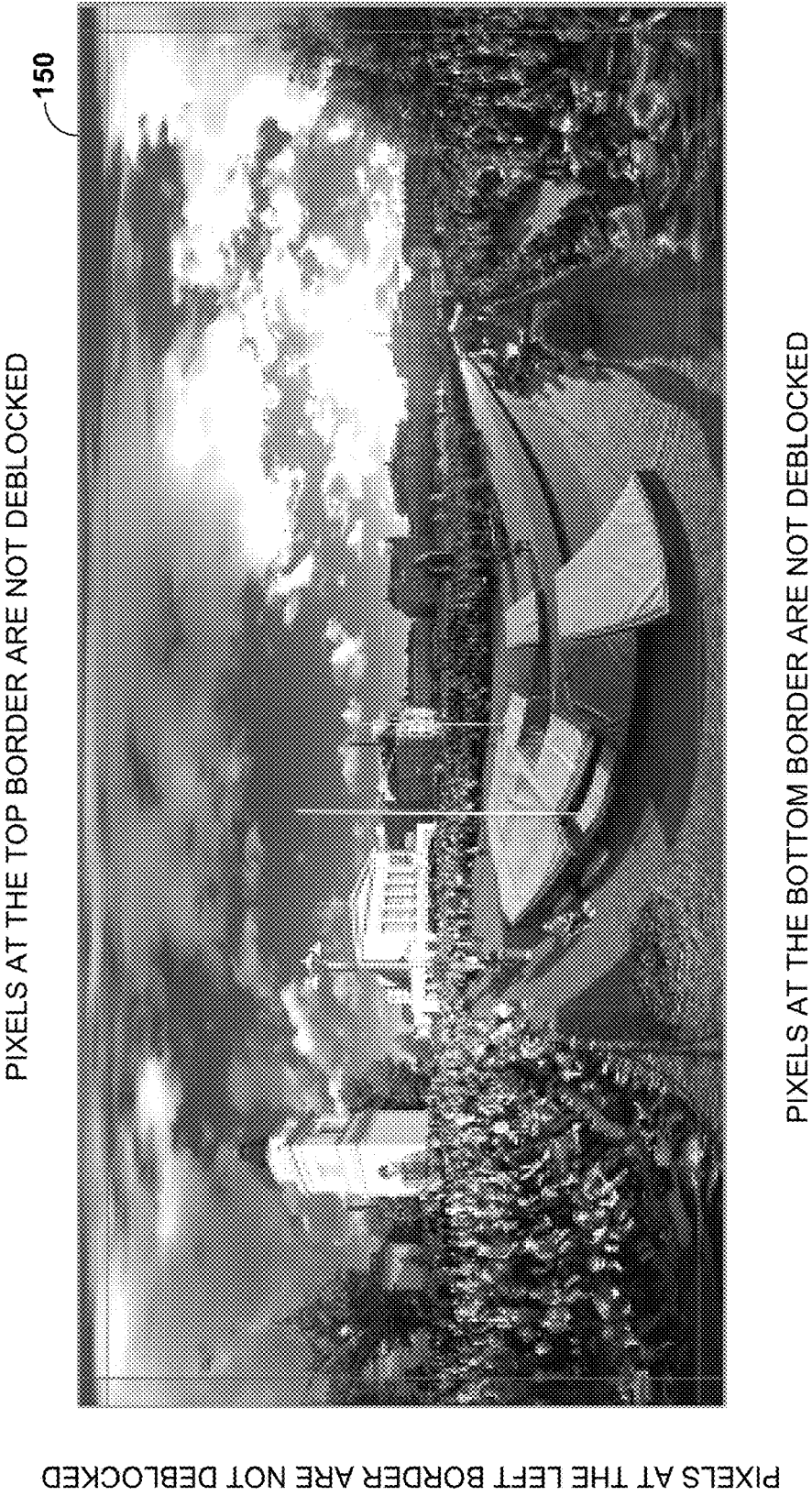
FIG. 3 illustrates one frame of 360-degree video packed with an equirectangular projection (ERP).

Video encoder 20 and video decoder 30 may be configured to encode and decode, respectively, 360-degree video data using a compression scheme for 2D video, such as AVC and HEVC. Generally, in 2D video compression, a deblocking process is not applied to all borders of blocks at the picture border. This is expected, as blocks at the borders of a picture do not have neighboring block at the outer edge of the border. FIG. 3 illustrates one frame of 360-degree video packed with an equirectangular projection (ERP). As shown in FIG. 3, the borders of frame 150 are not deblocked (i.e., deblocking filtering is not applied to pixels at the borders of frame 150).

Furthermore, the HEVC deblocking process employs only two kinds of filters: normal (i.e., weak) filter and a strong filter. The use of both the normal and strong filters is limited, in HEVC, to change pixel values only up to 4 pixels in each direction (e.g., 4 pixels to the left and 4 pixels to the right in case of deblocking for vertical border). Since an ERP projection stretches 360-degree video content as it gets to the poles when projecting from sphere to 2D, having a fixed filter size (i.e., up to 4 pixels only) may not be sufficient.

Figure 4A:
FIG. 4A and FIG. 4B depict visual artifacts in 360-degree video data with ERP due to lack of deblocking at picture borders.
Figure 4B:
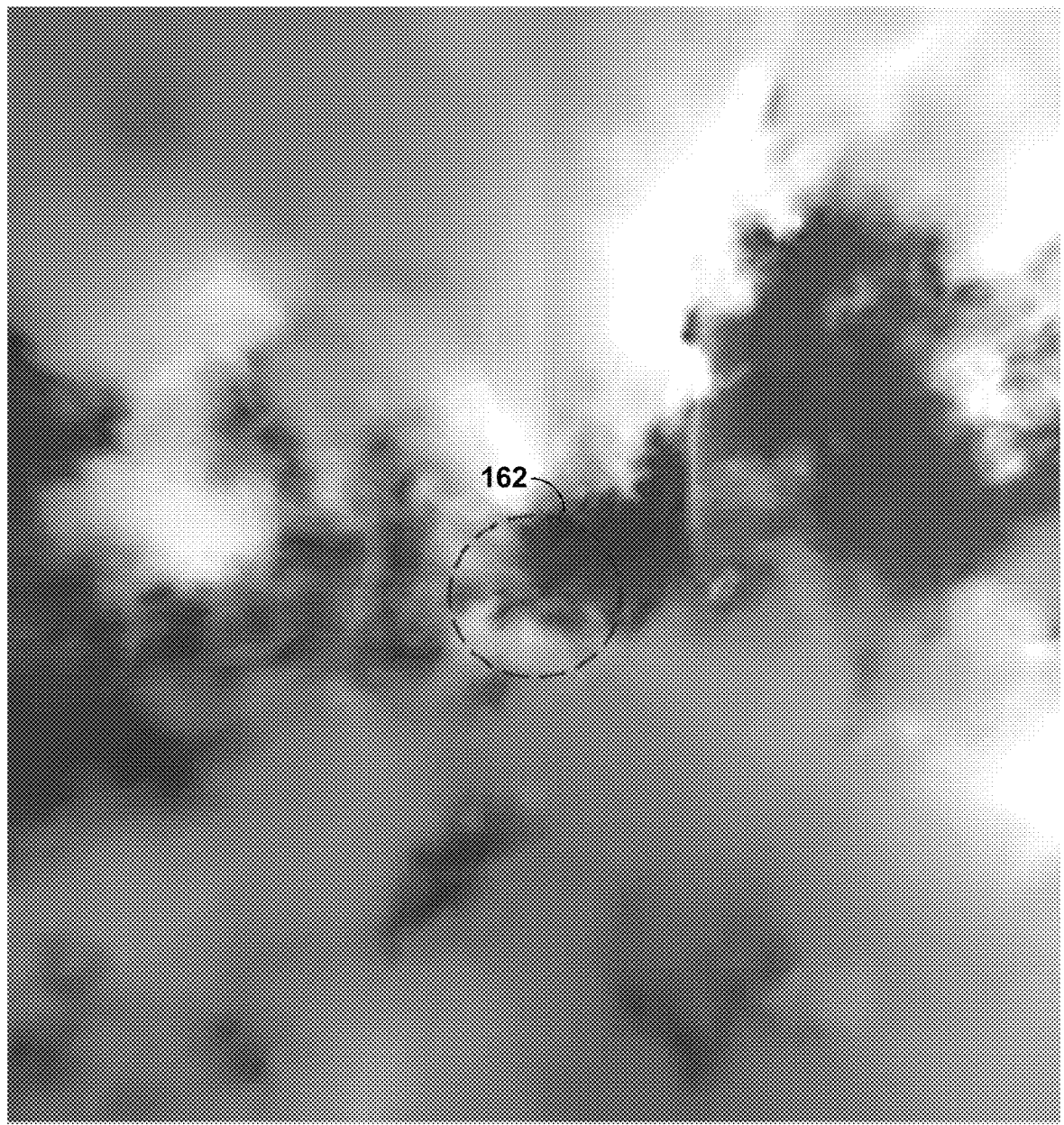

The lack of deblocking at the picture border for 360-degree video with ERP projection may consequently cause visible artifacts at each pole of the 360-degree video and at the back of the 360-degree video as depicted FIG. 4A and FIG. 4B. At the back of the 360-degree video, the lack of deblocking at the left and right picture border can cause a visible line 160 as depicted in FIG. 4A. At the poles area (i.e., both the north and south poles) of the 360-degree video, the lack of deblocking at the top and bottom picture border and the fixed filters and its fixed number of affected pixels by the filter may cause a visible radial spot 162 concentrated at each pole, as shown in FIG. 4B.

Similar problems may also be present for 360-degree video data coded with a CMP projection. As discussed above, coding of 360-degree video may use compression schemes for 2D video, such as AVC and HEVC. For 360-degree video with CMP projection, the current deblocking algorithms used in AVC and HEVC have several problems that are described below.

Figure 5:
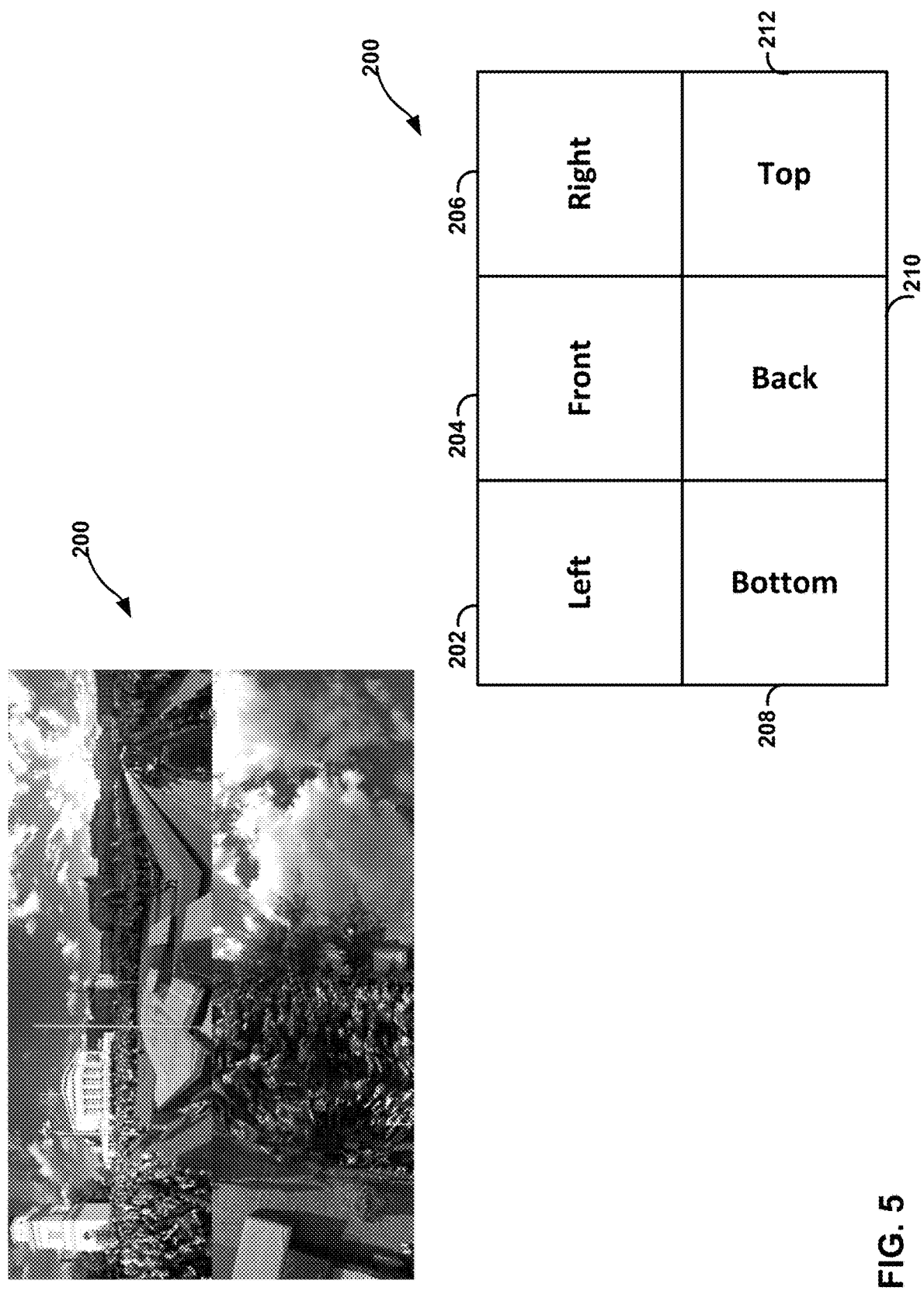
FIG. 5 is a conceptual diagram illustrating an example 3×2 packing structure for 360-degree video.

For example, in a compact representation of CMP projection (e.g., a 3×2 face arrangement), some cube faces that are neighboring in the 2D picture may not actually be neighboring in the sphere domain. FIG. 5 illustrates an example of 3×2 frame packing that video encoder 20 and video decoder 30 may use to pack a cubemap projection of 360-degree video data. As shown in FIG. 5, six faces of a cubemap projection for a frame of 360-degree video data may be packed into frame 200. Frame 200 is a data structure and may be considered analogous to a frame or a picture of 360-degree video data, and may be treated similarly to a frame or picture of 2D video data (e.g., an HEVC picture). However, frame 200 includes video data from each of the six faces of a projection of 360-degree video data onto a cube.

As shown in FIG. 5, the video data for the left cube face 202 is packed in the upper left corner of frame 200, the video data for the front cube face 204 is packed in the upper middle of frame 200, the video data for the right cube face 206 is packed in the upper right corner of frame 200, the video data for the bottom cube face 208 is packed in the lower left corner of frame 200, the video data for the back cube face 210 is packed in the lower middle of frame 200, and the top cube face 212 is packed in the lower right corner of the frame 200. As shown in FIG. 5, the arrangement of the text of the left, front, right, bottom, back and top cube faces also indicates the orientation of the video data within frame 200. It should be understood that the 3×2 packing arrangement of frame 200 is just an example, and other orders and orientations of cube faces may be used.

In some examples of the disclosure, video encoder 20 may be configured to generate and signal one or more syntax elements in the encoded video bitstream that indicate the packing scheme used to pack a cubemap projection into frame 200. Video decoder 30 may be configured to receive and parse the one or more syntax elements to determine the packing scheme. In other examples, the packing scheme to use may be predetermined and stored at both video encoder 20 and video decoder 30.

When generating and packing a cubemap projection and/or an ACP, there may be discontinuities or deformations along the edges of each cube face. Deformations arise from the projection technique used, while the discontinuities may be the result of the packing scheme. Due to the projection techniques used, deformations can often occur at the certain cube face boundaries (e.g., deformation between left and front cube faces or between front and right cube faces).

The top row of three cube faces are continuous, representing left, front and right faces. Similarly, the bottom row of three cube faces represents top, back, and bottom cube faces. However, the bottom row is rotated by 90 degrees. As such, there may be discontinuities along the borders of cube faces. For example, the video data at the bottom of front cube face 204 may not flow directly to the top edge of back cube face 210, even though they are adjacent.

Figure 6:
FIG. 6 illustrates an artifact in 360-degree video data.

As discussed above, in example compact representations of a cubemap projection, the cube faces in the upper part of the picture are not actually immediate neighbors of cube faces in the lower part of the picture in the sphere domain. However, as they are placed next to each other in the 2D domain, during encoding, deblocking may or may not be applied. At least two problems are present because of such arrangement. When a particular encoded bitstream uses a low quantization parameter (QP) value, the current HEVC deblocking algorithm can detect that the block at the borders of the top and bottom row of the 3×2 compact representation do not have continuous content. As such, no deblocking at that border will be applied. The lack of deblocking along that border may cause a visible artifact. When a particular encoded bitstream uses a high QP value, the current HEVC deblocking algorithm may apply deblocking to that border and this can cause more visible artifacts than the artifact caused by the prior point. FIG. 6 illustrates such an artifact as a visible line that is highlighted in the dashed ellipse 170.

Figure 7A:
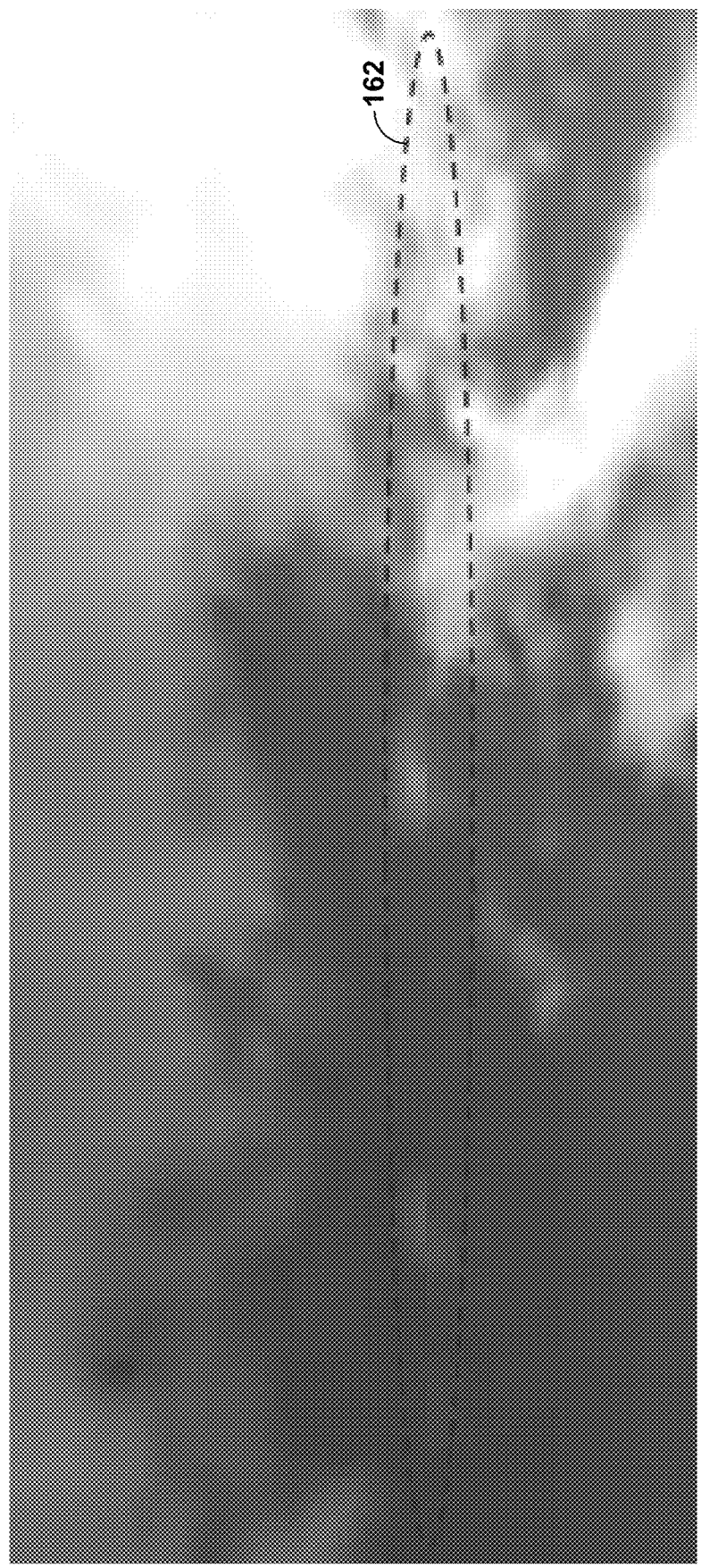
FIG. 7A and FIG. 7B depict visual artifacts due to the lack of deblocking at cube face borders of 360-degree video with cubemap projection.
Figure 7B:

In 2D video compression, a deblocking process is typically not applied to all borders of blocks at the picture border, which is expected as those blocks do not have neighboring block at one of its border. The lack of deblocking at the picture border for 360-degree video with cubemap projection may cause visible artifacts at some cube face border. FIG. 7A shows an artifact highlighted in ellipse 162 that is due to the lack of deblocking at the top border of 360-degree video with cubemap projection. FIG. 7B shows an artifact highlighted in ellipse 164 that is due to the lack of deblocking at the left most border of 360-degree video with cubemap projection.

This disclosure describes techniques for performing deblock filtering on 360-degree video data (e.g., luma and/or chroma samples of pixels) projected and packed according to an equirectangular or cubemap projections. The techniques of this disclosure may address problems with deblock filtering when portions of a projected 360-degree video data are not continuous in a packed 2D frame.

In accordance with some examples of this disclosure, video encoder 20 and video decoder 30 may be configured to apply deblocking at all edges/borders of blocks that are located at a face border. Note that different projections may have different numbers of faces in a picture. For example, for equirectangular projection, there is only one face per picture, whereas for cubemap projection, each picture has 6 faces. Since for equirectangular projection each picture has one face, the term picture and face may be used interchangeably in the rest of this document. In examples where the disclosed techniques discussed relative to equirectangular projections are applied to other projections, such as cubemap projections, appropriate substitution is to be inferred.

Figure 8:
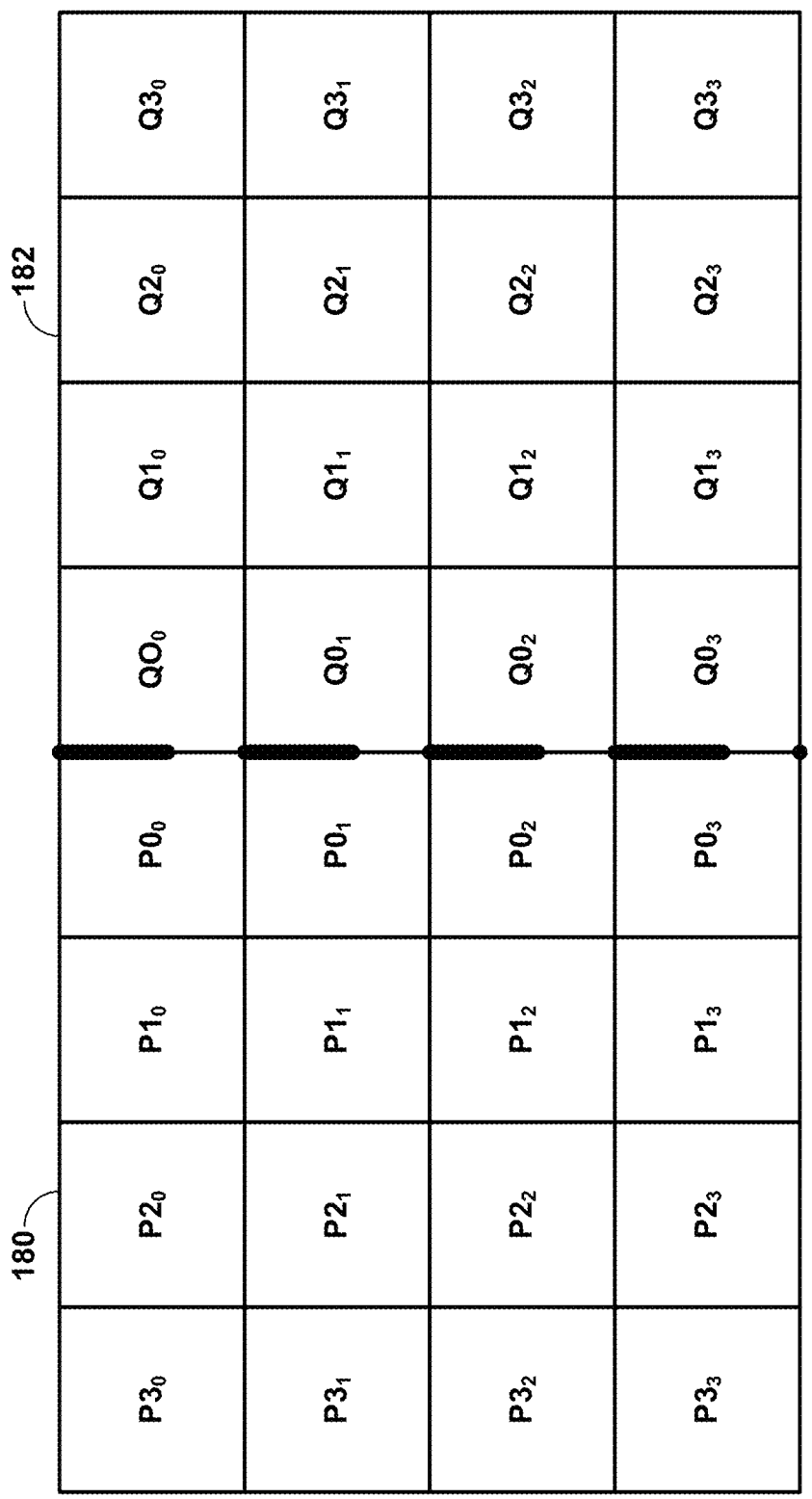
FIG. 8 is a conceptual diagram illustrating a current block and a pairing neighbor block that may be used in deblock filtering.

In some examples of the deblock process for 2D video, video encoder 20 and video decoder 30 may deblock a block P against a pairing block Q, which may be an immediate neighboring block of P. FIG. 8 illustrates a block P 180 next to neighboring paring block Q 182 to be used for deblocking. Block P 180 includes sixteen pixels $P3_0$-$P0_3$. The first number in each pixel designation (e.g., the 3 in $P3_0$) represents the column in the block and the subscript of each pixel designation (e.g., 0 in $P3_0$) represents the row block. Each pixel in block P and Q are paired such that PXy is paired with QXy.

Figure 9:
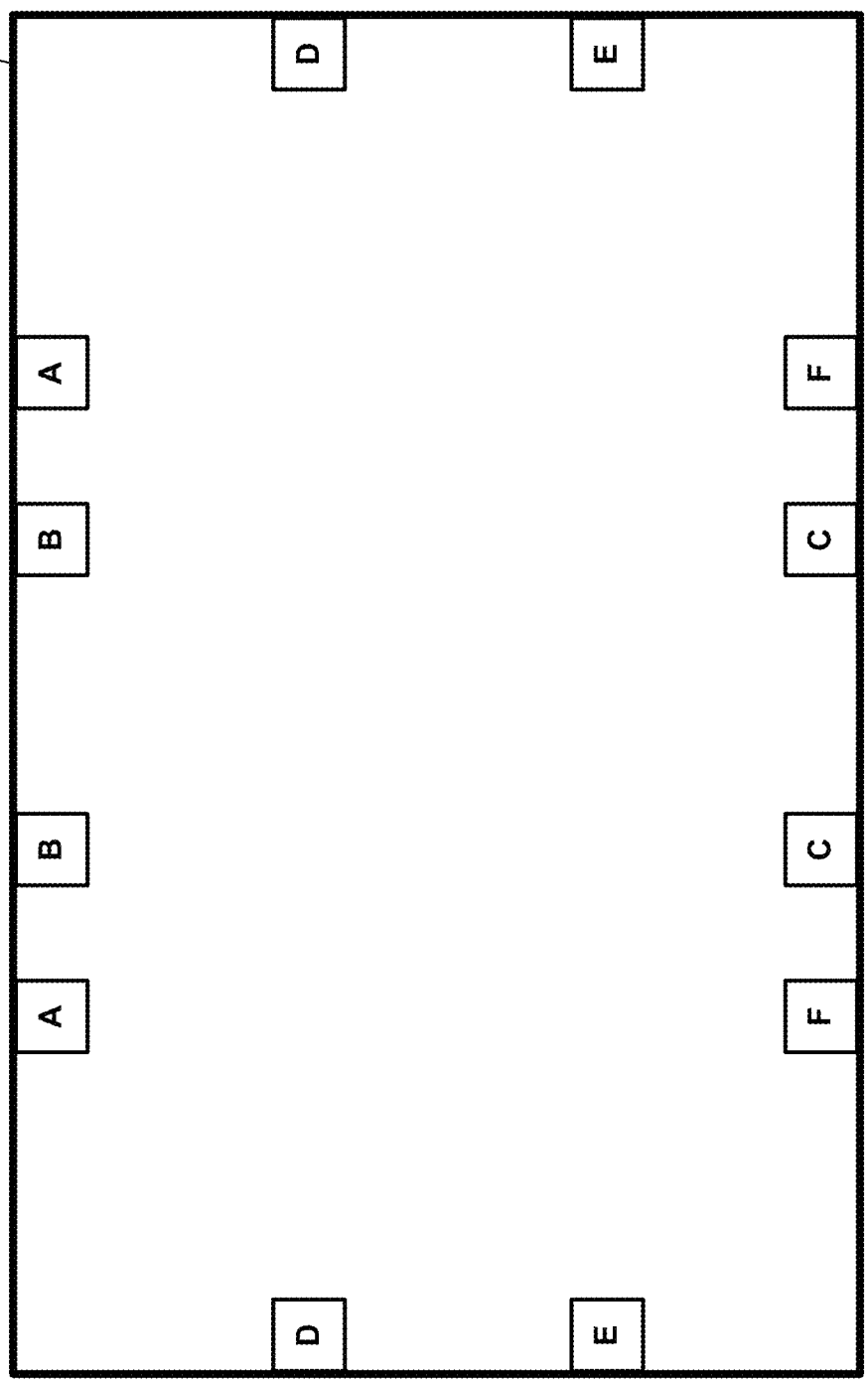
FIG. 9 shows an example of a picture of 360-degree video data packed with an equirectangular projection.

FIG. 9 shows an example of a picture 190 of 360-degree video data packed with an equirectangular projection. In some examples of deblock filtering (e.g., HEVC), the blocks shown with the letter designations A-F are not deblocked, as they are on the edges of the 2D picture. However, due to the equirectangular projection, the blocks in picture 190 that have the same letter designation are actually adjacent in the sphere of 360-degree video, even if they are not adjacent in the 2D picture resulting from the projection. That is, when the 360-degree video data represented in picture 190 is converted back to a sphere of 360-degree video data, both of blocks A will be adjacent, both of blocks B will be adjacent, both of blocks C will be adjacent, etc. The letter designation blocks in FIG. 9 are just an example. Due to the equirectangular projection, blocks along the left and right edges of picture 190 may have adjacent blocks in the 360-degree video. Likewise, blocks along on the top and bottom edges of picture 190 may have adjacent blocks in the 360-degree video. As such, according to one example of the disclosure, video encoder 20 and video decoder 30 may be configured to deblock pairs of blocks that are adjacent in the 360-degree video.

As one example, video decoder 30 may be configured to receive video data indicative of a 360-degree video picture projected onto a 2D picture, the 2D picture being divided into a plurality of blocks. In the example of FIG. 9, the 2D picture 190 is an equirectangular projection. Video decoder 30 may then perform any number of prediction process on the blocks of the 2D picture to decode the blocks. After decoding, video decoder 30 may deblock filter pixels along a border of a first block and a second block of the picture based on the position of the border between the first and second of the blocks in the 360-degree video picture. In the example of FIG. 9, video decoder 30 may deblock both of blocks A as a deblocking pair, video decoder 30 may deblock both of blocks B as a deblocking pair, video decoder 30 may deblock both of blocks C as a deblocking pair, video decoder 30 may deblock both of blocks D as a deblocking pair, video decoder 30 may deblock both of blocks E as a deblocking pair, and video decoder 30 may deblock both of blocks F as a deblocking pair. Video encoder 20 may perform the same deblocking process for reconstructed pictures in the video encoder reconstruction loops.

In some examples, video encoder 20 and video decoder 30 may be configured to apply stronger and wider deblocking (i.e., the filter changes more pixel values than the current max 4 pixels in each direction in HEVC deblocking) depending on the border, e.g., the relative position in the pairs of blocks that make up an edge in the 360-degree video (prior to projection onto a 2d rectangular picture). In FIG. 9, example pairs of blocks for which different, e.g., stronger and/or wider, filtering is to be applied are labeled with the same letter. A stronger filter as used here and in the examples that follow refers to a low pass filter with a stronger smoothing action, e.g., filter coefficients adjusted to more strongly filter high frequency components. A wider filter used here and in the examples that follow refer to using a filter that is applied to more than a specified number of pixels in each direction from the border, e.g., more than 4 pixels as specified in HEVC deblocking.

Similar techniques may be applied to 360-degree video data that is packed with a cubemap projection. For example, video encoder 20 and video decoder 30 may deblock filter pixels along a border (e.g., cube face border) of a first block and a second block of the picture based on the position of the border between the first and second of the blocks in the 360-degree video picture. That is, for deblocking during encoding and/or decoding of 360-degree video with cubemap projections and other derivative projections, in some examples, video encoder 20 and video decoder 30 may be configured to perform deblocking at all edges/border of each face. In practice, this can be simplified by applying the deblocking at edges/borders of blocks that are located at picture border and middle border for compact representation in comparison to other systems in which deblock is applied incorrectly using incompatible block pairs.

For example, video encoder 20 and video decoder 30 may be configured to apply deblock filtering of pixels along a border of a first block based on the position of the border in the 360-degree video picture. Video encoder 20 and video decoder 30 may be configured to determine that the first blocks and second blocks are pairs of blocks for which the border is to be deblocked according to a particular deblocking filter (or at all) that is different than for the first block and others of the blocks of the 2D picture (which may be not be deblock filtered or deblock filtered differently). Like the equirectangular projection example, video encoder 20 and video decoder 30 may configured to apply deblock filtering to a pair of blocks that are actually adjacent to one another in the sphere of 360-degree video, even if such blocks are not adjacent to one another in the 2D projection of the 360-degree video data.

Figure 10:
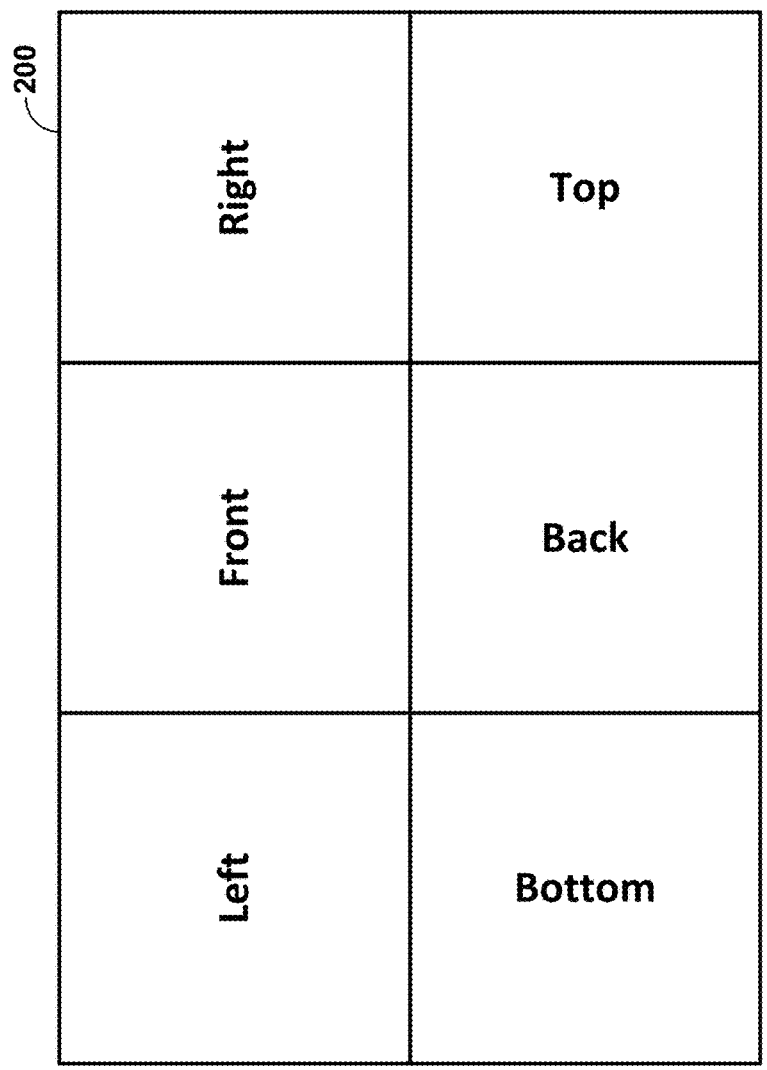
FIG. 10 illustrates a cube of projected 360-degree video data and an example 3×2 compact representation in a 2D rectangular picture.
Figure 10:
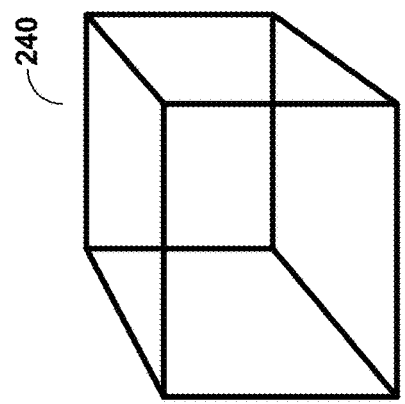
Figure 11:
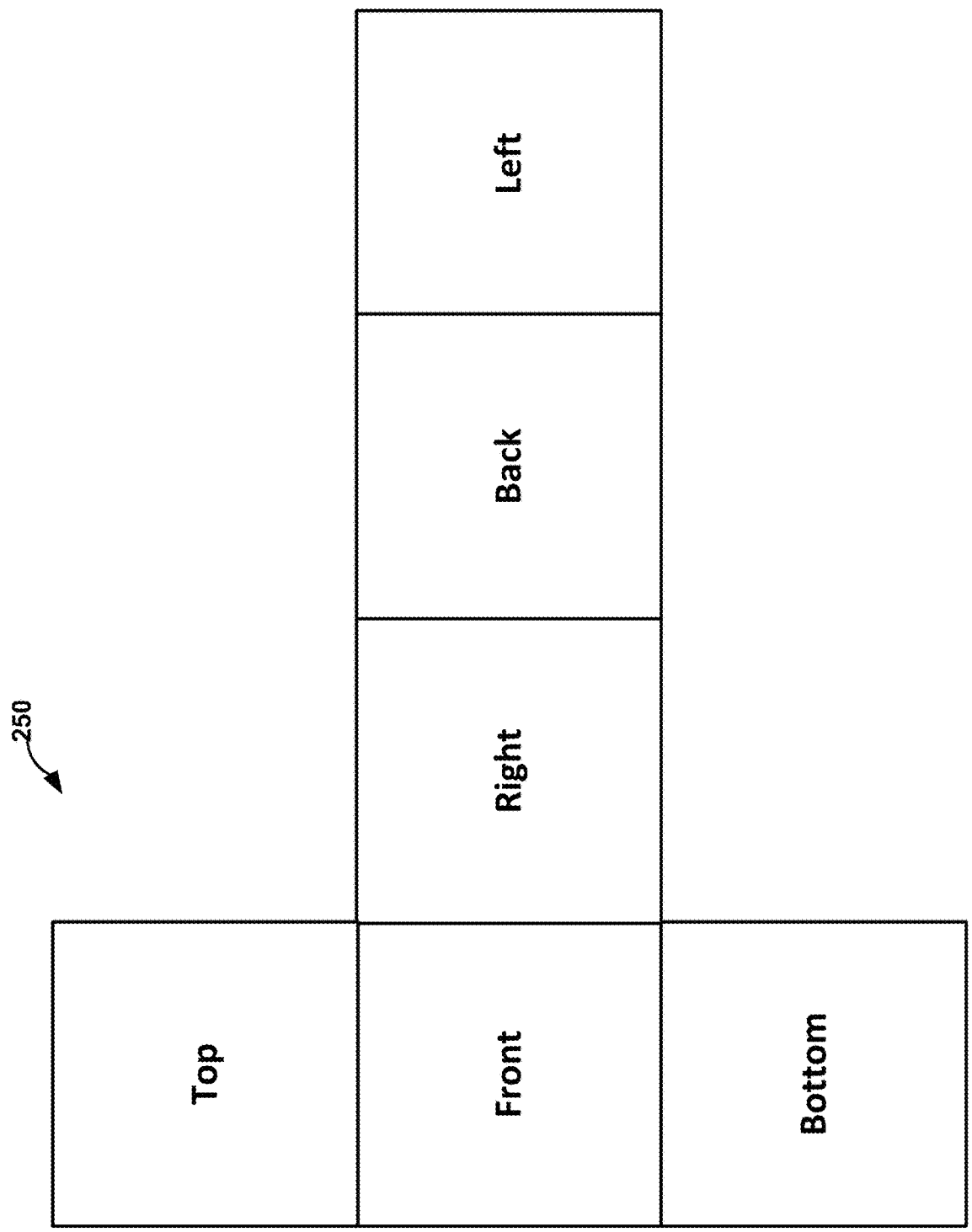
FIG. 11 illustrates an example of cubemap projection into a 2D rectangle picture using a 4×3 representation.

FIG. 10 illustrates a cube 240 of projected 360-degree video data and an example 3×2 compact representation in a 2D rectangular frame 200 (e.g., as described above in FIG. 5). FIG. 11 illustrates an example of cubemap projection into 2D rectangle picture 250 using a 4×3 representation. Note that there may be more variations of how cube faces of a cube are arranged in a 2D frame.

Figure 12:
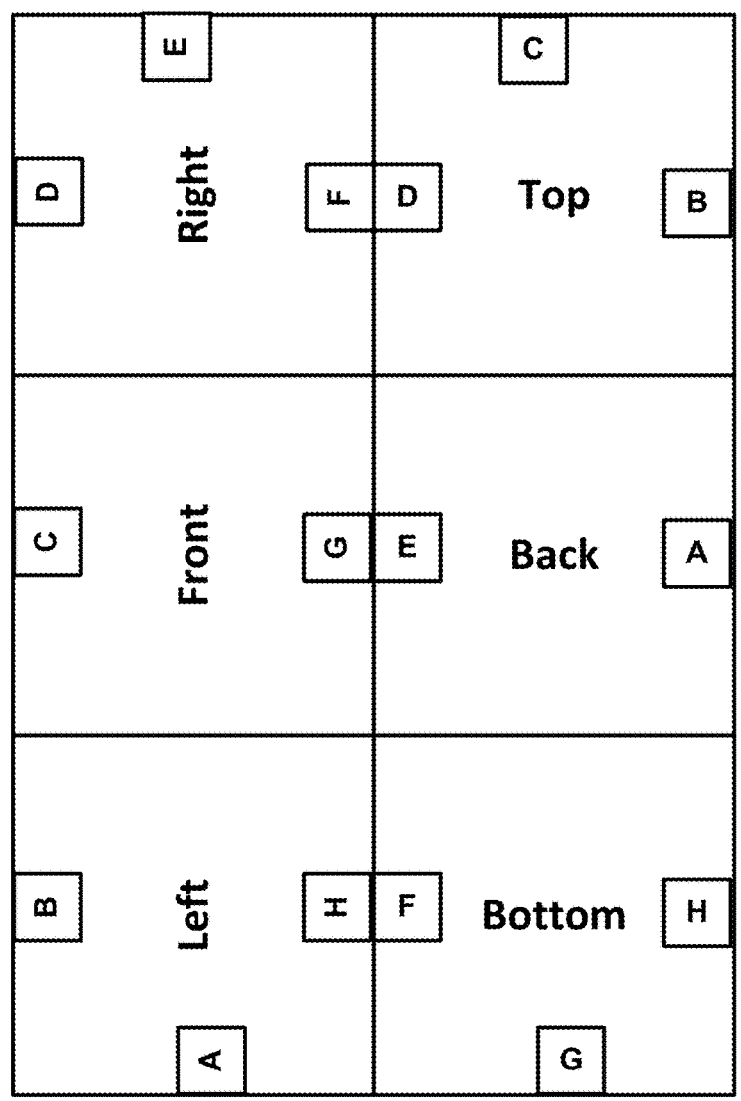
FIG. 12 shows an example of adjacent edges of a picture of 360-degree video data packed with a 3×2 cubemap projection.

FIG. 12 shows an example of a picture 260 of 360-degree video data packed with an cubemap projection. In some examples of deblock filtering (e.g., HEVC), the blocks shown on the outer edges of picture 260 are not deblocked, as they are on the edges of the 2D picture. In addition, blocks that border discontinuous cube faces (e.g., left/bottom edge, front/back edge, right/top edge) would be deblocked, even though the video data along such edges is not continuous in the sphere of 360-degree video. Such processes may produce undesirable artifacts in the coded 360-degree video data.

Due to the cubemap projection, the blocks in picture 260 that have the same letter designation are actually adjacent in the sphere of 360-degree video, even if they are not adjacent in the 2D picture resulting from the projection. That is, when the 360-degree video data represented in picture 260 is converted back to a sphere of 360-degree video data, both of blocks A will be adjacent, both of blocks B will be adjacent, both of blocks C will be adjacent, etc. The letter designation blocks in FIG. 12 are just an example. Due to the cubemap projection, all blocks along cube face edges having the same letter designation may be adjacent blocks in the 360-degree video.

As such, according to one example of the disclosure, video encoder 20 and video decoder 30 may be configured to deblock pairs of blocks that are adjacent in the 360-degree video. In some examples, for blocks at a cube face border, the block pairings for deblocking of edges are shown in FIG. 12 as edges labeled with the same letter.

Video decoder 30 may be configured to receive video data indicative of a 360-degree video picture projected onto a 2D picture, the 2D picture being divided into a plurality of blocks. In the example of FIG. 12, the 2D picture 260 is a cubemap projection. Video decoder 30 may then perform any number of prediction process on the blocks of the 2D picture to decode the blocks. After decoding, video decoder 30 may apply deblock filtering for pixels along a border of a first block and a second block of the picture based on the position of the border between the first and second of the blocks in the 360-degree video picture.

Figure 13:
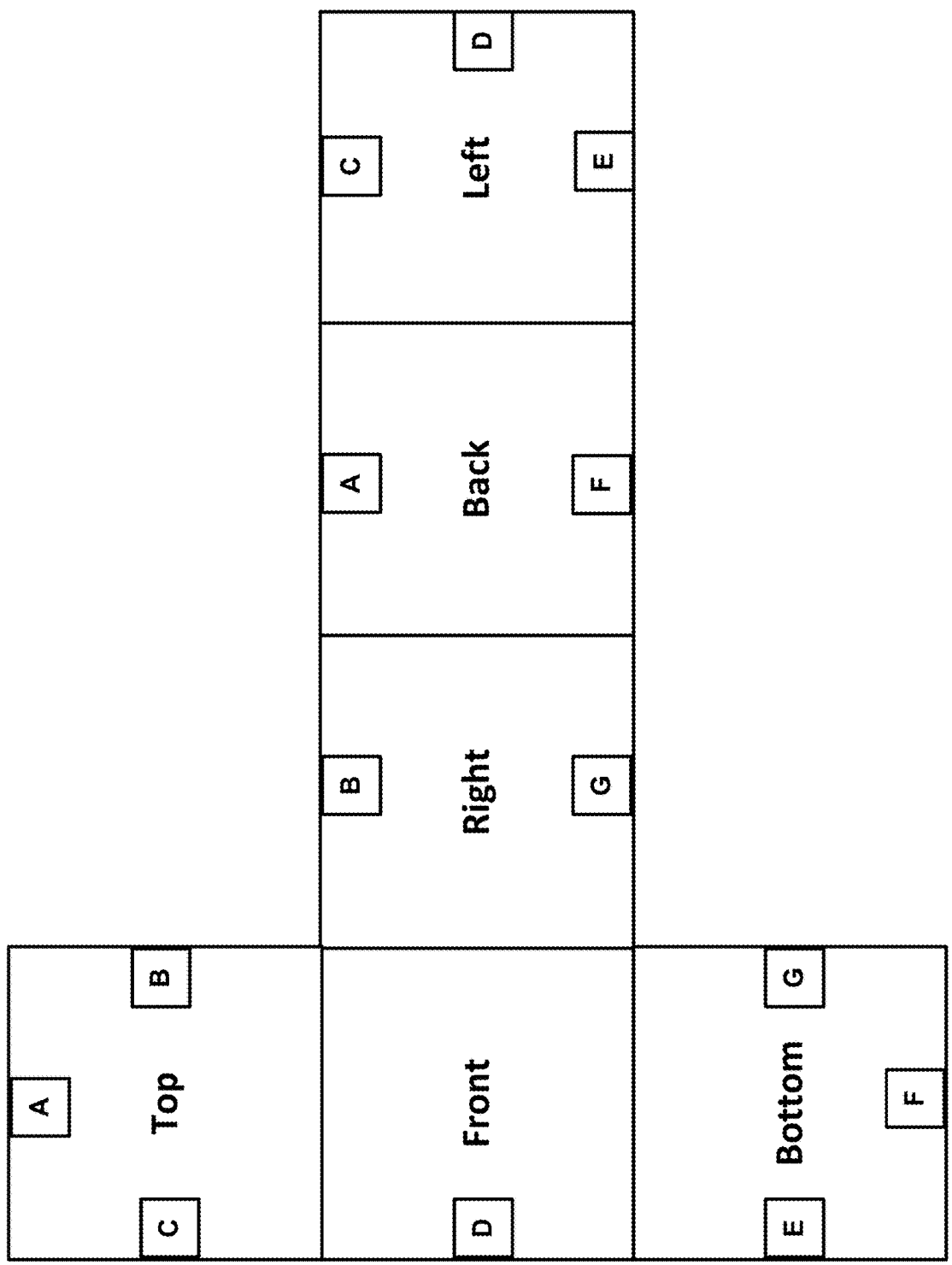
FIG. 13 shows an example of adjacent edges of a picture of 360-degree video data packed with a 4×3 cubemap projection.

In the example of FIG. 12, video decoder 30 may deblock both of blocks A as a deblocking pair, video decoder 30 may deblock both of blocks B as a deblocking pair, video decoder 30 may deblock both of blocks C as a deblocking pair, video decoder 30 may deblock both of blocks D as a deblocking pair, video decoder 30 may deblock both of blocks E as a deblocking pair, video decoder 30 may deblock both of blocks F as a deblocking pair, video decoder 30 may deblock both of blocks G as a deblocking pair, and video decoder 30 may deblock both of blocks H as a deblocking pair. Video encoder 20 may perform the same deblocking process for reconstructed pictures in the video encoder reconstruction loops. A similar process may be performed along the letter designated edges of the 4×3 representation shown in FIG. 13.

Deblocking block pairs for other representation variations can be adjusted with the same principle as the above two examples. In particular, for a particular projection of 360-degree video onto 2D blocks, for each 2D projected block edge, deblock filtering is applied to edges based on the neighbor of the block in the 360-degree video. Hence, in some such examples, 2D blocks at the edge of the picture may still be deblocked.

The following describes additional examples of deblocking for face borders of an equirectangular projection of 360-degree video data. In a first example, video encoder 20 and video decoder 30 may be configured to deblock the top and bottom border of a picture that is an equirectangular projection. For the top border of the picture, one example deblocking filter for horizontal edges is as follows. Let W denote the width of the picture. For two blocks P and Q, where block Q is located at the right side of P (i.e., may or may not be immediately adjacent to P), and block P with width $W_P$ is located at $(X_P, 0)$ (i.e., the top most, left most pixel of block P) relative to the top left corner of the picture frame. The location of block Q (i.e., $(X_Q,0)$) can be calculated as follows:

$$X_Q = W - X_P - W_P$$

FIG. 14 illustrates an example pixel pairing between block P 300 and block Q 302 for along the top border of 360-degree video data with an equirectangular projection.

A similar approach may be applied for bottom border of the face. Let W and H denote the width and height of the picture. For two blocks P and Q, where block Q is located at the right side of P (i.e., may or may not immediately adjacent block P), and block P with width $W_P$ and height $H_P$ is located at $(X_P, H-H_P)$. The location of block Q (i.e., $(X_Q, H-H_P)$) can be calculated as follows:

$$X_Q = W - X_P - W_P$$

FIG. 15 illustrates an example pixel pairing between block P 304 and block Q 306 for along the bottom border of 360-degree video data with an equirectangular projection.

Video encoder 20 and video decoder 30 may also be configured to perform deblocking at the left and right most border of a picture of 360-degree video data with an equirectangular projection. For the left most border of the picture, according to one example, deblocking for vertical edges is performed as follows.

Let W denote the width of the picture. For two blocks P and Q, where block Q is located at the right side of P (i.e., not immediately adjacent), and block P with width WP is located at $(0, Y_P)$ relative to the top left corner of picture frame. The location of block Q (i.e., $(X_Q, Y_Q)$) can be calculated as follows:

$$X_Q = W - W_P$$

$$Y_Q = Y_P$$

Figure 16:
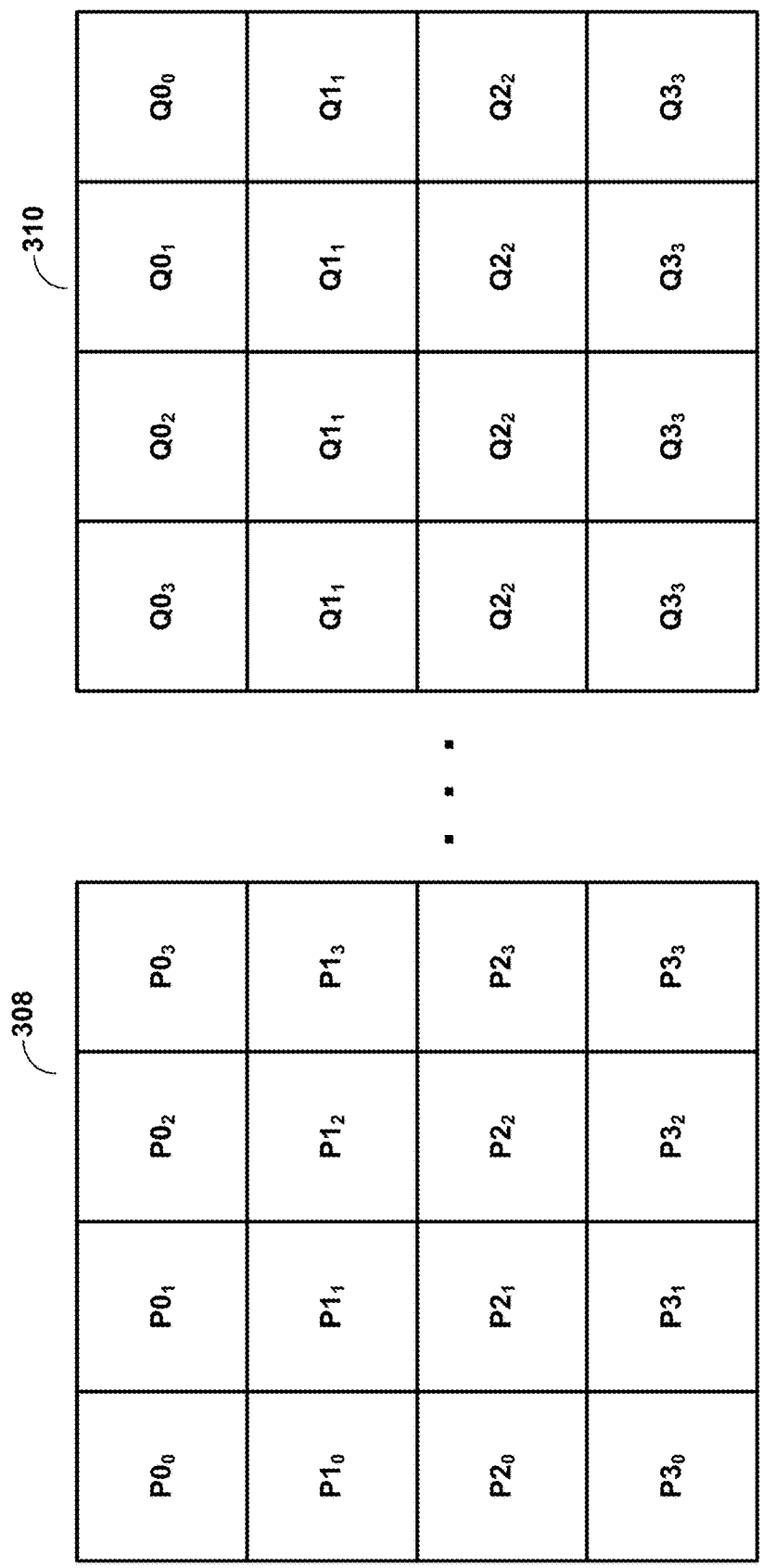
FIG. 16 illustrates an example pixel pairing between block P and block Q for along the left border of 360-degree video data with an equirectangular projection.

FIG. 16 illustrates an example pixel pairing between block P 308 and block Q 310 for along the left border of 360-degree video data with an equirectangular projection.

A similar approach may be applied for the right most border of the picture. Let W denote the width of the picture. For two blocks P and Q, where block Q is located at the left side of P (i.e., not immediately adjacent), and block P with width $W_P$ is located at $(W-W_P, Y_P)$ relative to the top left corner of picture frame. The location of block Q (i.e., $(X_Q, Y_Q)$) can be calculated as follows:

$$X_Q = 0$$

$$Y_Q = Y_P$$

FIG. 17 illustrates an example pixel pairing between block P 312 and block Q 314 for along the right border of 360-degree video data with an equirectangular projection.

Figure 18:
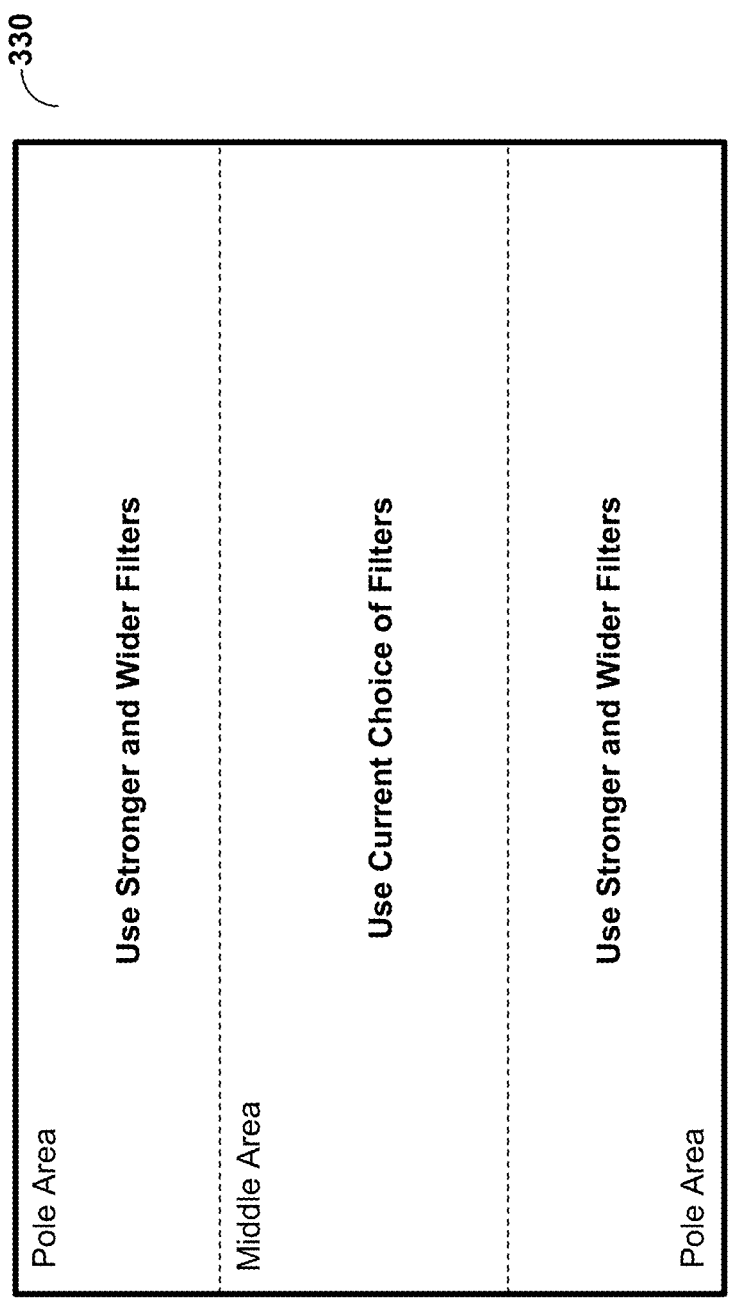
FIG. 18 is a conceptual diagram illustrating the use of different filters in different sections of a picture.

In other examples of the disclosure, video encoder 20 and video decoder 30 may be configured to perform deblocking of pictures of 360-degree video data with stronger smoothing filters and wider filters. To apply stronger and wider filters, according to some examples of the disclosure, video encoder 20 and video decoder 30 may be configured to divide a 360-degree video frame with ERP projection into three or more sections (for example, one middle area and two pole areas) as illustrated in picture 330 in FIG. 18. For middle area(s), one type of deblock filtering may be used, e.g., an existing deblocking filter such as a filter from HEVC can be used. For pole areas, in some examples, the deblocking includes applying a stronger low pass filter (i.e., a filter that gives more smoothing effect to the input pixel values relative to an HEVC deblocking filter). This stronger low pass filter used for pole areas may optionally include a wider filter (e.g., a filter that changes more pixel values than the current max 4 pixels in HEVC). Depending on the example use case, the division between the middle area and each pole area may be fixed or adaptively divided based on the picture content being deblocked. In some cases, the middle area may be defined as most or all of the picture so that the deblocking becomes the same as the existing algorithm; on the other hand, in some examples, both poles areas can be as big as half of the picture size.

In some examples, video encoder 20 and video decoder 30 may adaptively determine the choice of stronger and wider filters for pole areas based on the location of the block within the picture. For example, for north pole area (e.g., near top border of a picture), a border of two blocks may be deblocked with a stronger and wider filter than a border of two other blocks that are located closer to the middle of the picture, and vice versa for a border in the south pole area (e.g., near the bottom border of a picture).

In some examples, the various features described above with respect to equirectangular projection may also be used in suitable combination with a cubemap projection.

Figure 19:
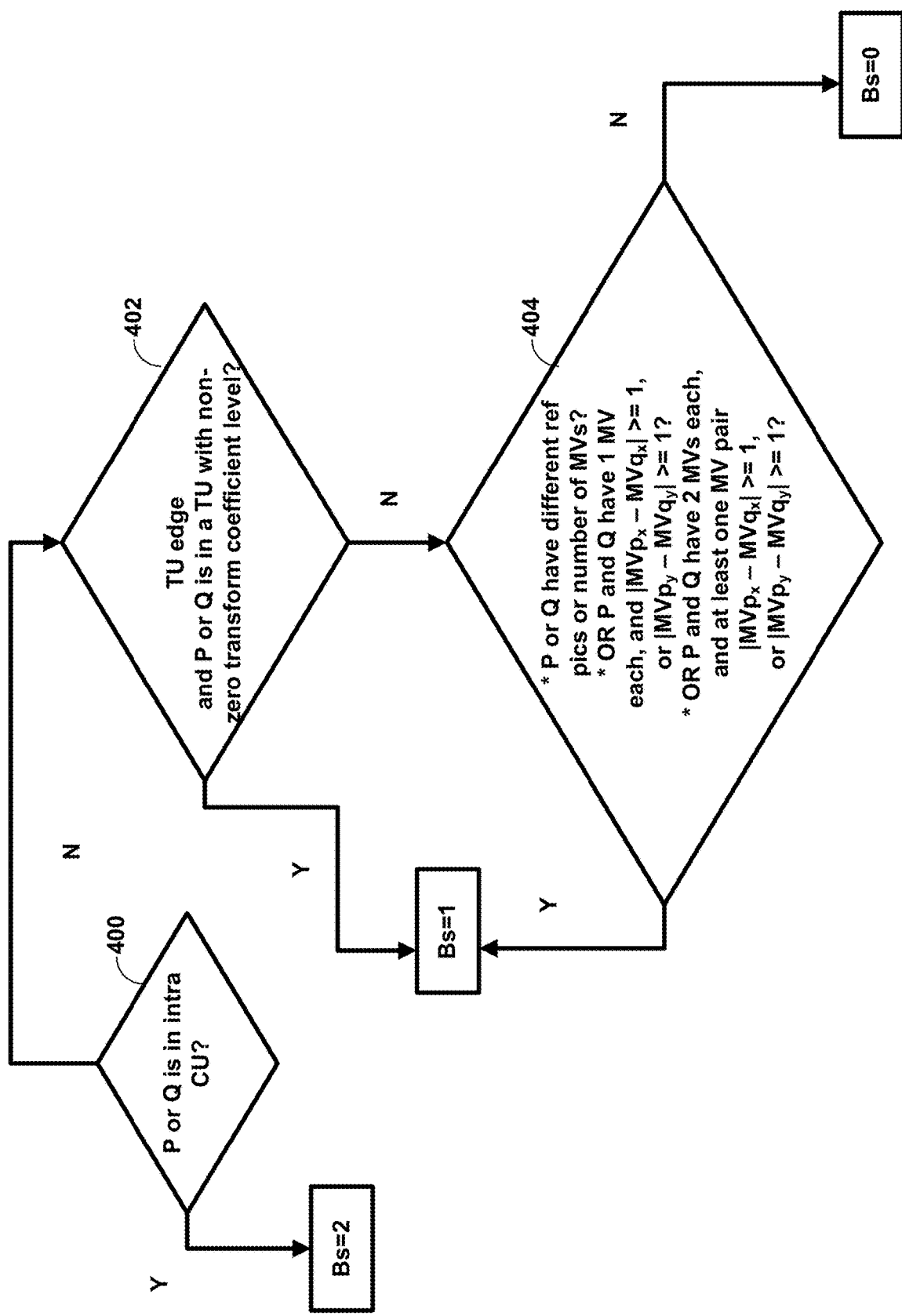
FIG. 19 depicts an example process for boundary strength derivation.

In some examples, video encoder 20 and video decoder 30 may adjust a boundary strength calculation appropriately as the coding unit (CU) and transform unit (TU) associated with P and Q blocks may not be actually adjacent to each other. For example, information such as one or more of a CU's coding mode, number of reference pictures, motion vector values, and TU's edges and coefficients may be used for this boundary strength calculation. For example, FIG. 19 depicts an example process for boundary strength derivation. Video encoder 20 and video decoder 30 may perform boundary strength derivations for 360-degree video with equirectangular projection or cubemap projections, etc., using one or more of the factors used in FIG. 19.

For example, video encoder 20 and video decoder 30 may determine if the P block or Q block is in an intra CU (400). If yes (Y), video encoder 20 and video decoder 30 may determine a boundary strength (Bs) of two (e.g., a boundary strength with index 2). If no (N), video encoder 20 and video decoder 30 may determine if a TU edge and the P or Q block is in a TU with non-zero transform coefficient levels (402). If yes, video encoder 20 and video decoder 30 may determine a boundary strength (Bs) of one (e.g., a boundary strength with index 1). If no, video encoder 20 and video decoder 30 may make the determination of process 404. That is, if any of the following conditions of process 404 is true, video encoder 20 and video decoder 30 may determine a boundary strength (Bs) of one (e.g., a boundary strength with index 1). If all of the following conditions are not true, video encoder 20 and video decoder 30 may determine a boundary strength (Bs) of zero (e.g., a boundary strength with index 0). The conditions are:

(1) P or Q blocks have different reference pictures or number of motion vectors; OR (2) P and Q blocks have one motion vector each, and the absolute value of the P motion vector in the X direction minus the Q motion vector in the X direction is greater than equal to one, or the absolute value of the P motion vector in the Y direction minus the Q motion vector in the Y direction is greater than equal to one; OR (3) P and Q blocks have two motion vectors each, and at least one motion vector pair has an absolute value of the P motion vector in the X direction minus the Q motion vector in the X direction that is greater than or equal to one, or the absolute value of the P motion vector in the Y direction minus the Q motion vector in the Y direction is greater than or equal to one.

Optionally, these specific boundary strengths for 360-degree video may determine the filter types to be applied to 360-degree video frame or cube face boundaries. Optionally, or in addition, filters may have various properties such as filtering strengths or filter widths selected using such factors.

Figure 20:
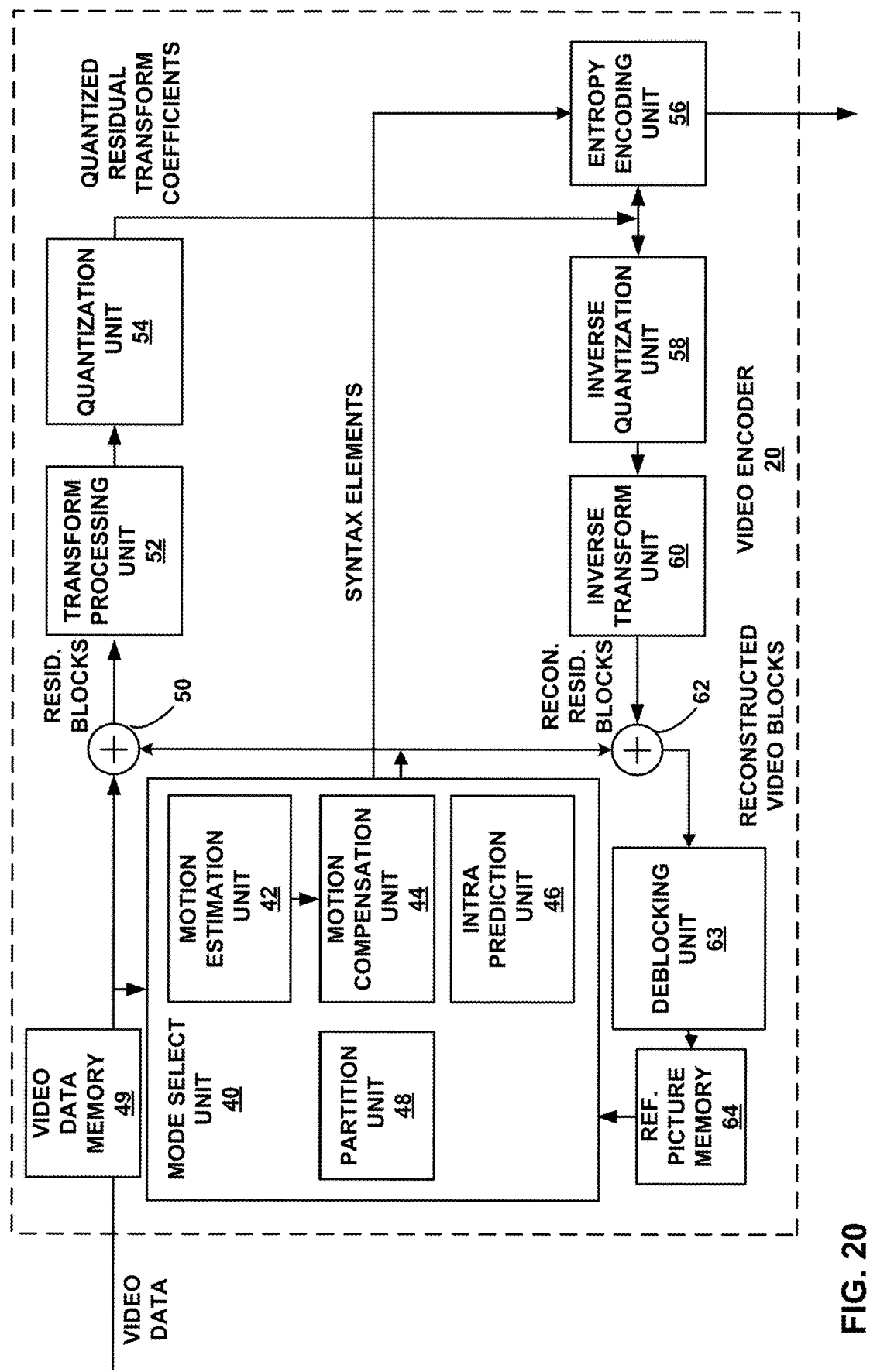
FIG. 20 is a block diagram illustrating an example video encoder configured to perform the techniques of this disclosure.

FIG. 20 is a block diagram illustrating an example of video encoder 20 that may implement techniques of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 20, video encoder 20 receives a current frame of video data to be encoded. In examples of this disclosure, the video frame may be a frame of 360-degree video data. The frame of 360-degree video data may be packed cube faces formed from a cubemap projection or an equirectangular projection of a sphere of 360-degree video data.

In the example of FIG. 20, video encoder 20 includes video data memory 49, mode select unit 40, reference picture memory 64 (which may also be referred to as a decoded picture buffer (DPB)), summer 50, transform processing unit 52, quantization unit 54, deblocking unit 63, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62.

Video data memory 49 may be configured to store video data to be encoded, including a sphere of 360-degree video data.

Deblocking unit 63 may be configured to filter block and cube face boundaries to remove blockiness artifacts from reconstructed video in accordance with the techniques described above. Deblocking unit 63 may filter the output of summer 62. Additional filters (in loop or post loop) may also be used in addition to the deblocking filter. Such filters are not shown for brevity, but if desired, may filter the output of summer 62 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively intra-predict the received video block using pixels of one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 21:
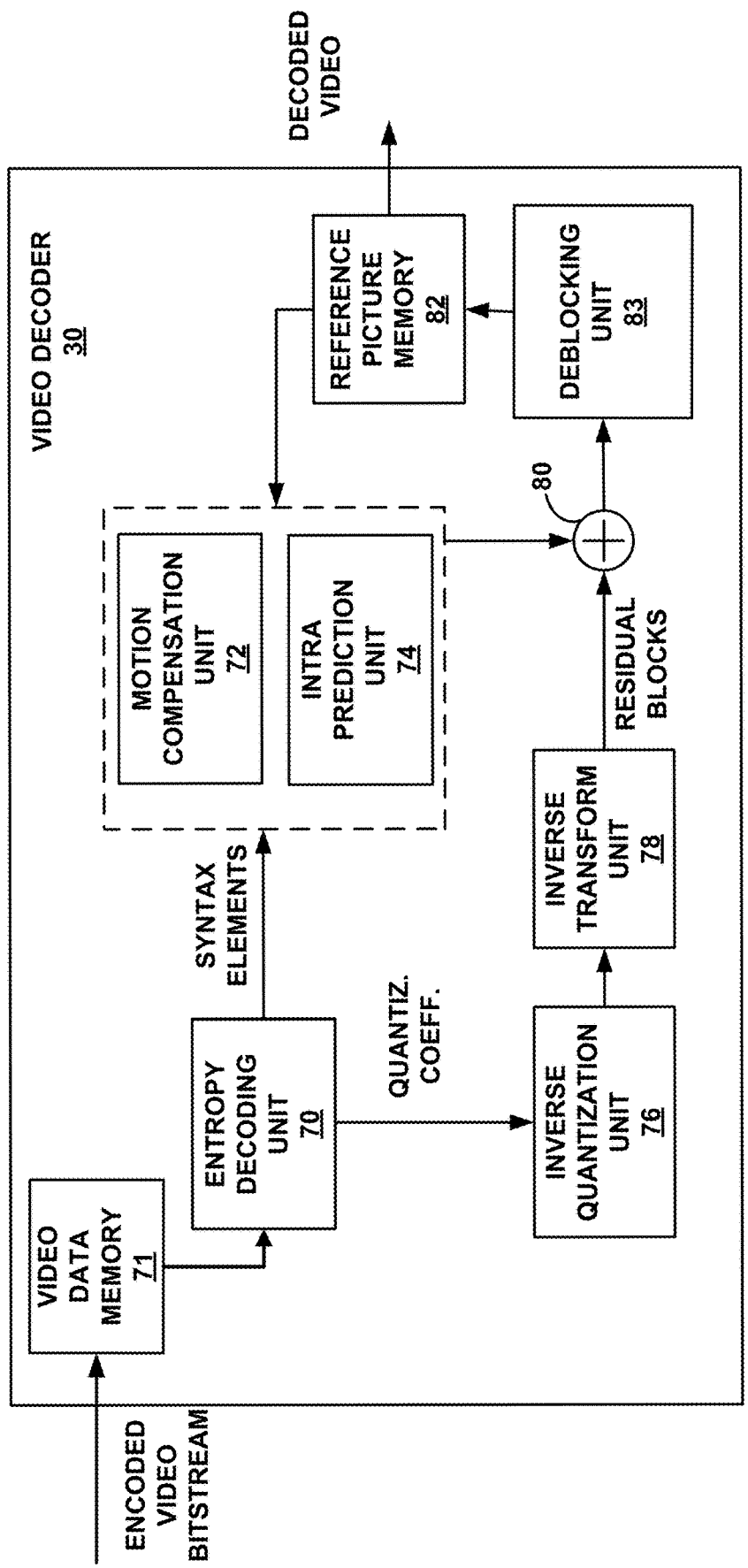
FIG. 21 is a block diagram illustrating an example video decoder configured to perform the techniques of this disclosure.

FIG. 21 is a block diagram illustrating an example of video decoder 30 that may implement techniques of this disclosure. In the example of FIG. 21, video decoder 30 includes a video data memory 71, an entropy decoding unit 70, motion compensation unit 72, intra-prediction unit 74, inverse quantization unit 76, inverse transformation unit 78, reference picture memory 82, deblocking unit 83 and summer 80. Video decoder 30 may, in some examples, perform a decoding pass generally reciprocal to the encoding pass described with respect to video encoder 20 (FIG. 20). Motion compensation unit 72 may generate prediction data based on motion vectors received from entropy decoding unit 70, while intra-prediction unit 74 may generate prediction data based on intra-prediction mode indicators received from entropy decoding unit 70.

Video data memory 71 may be configured to store video data to be decoded, including a packed frame of encoded 360-degree video data.

As shown in FIG. 21, video decoder receives an encoded video bitstream including a current encoded frame of video data to be decoded. In examples of this disclosure, the encoded video frame may be an encoded frame of 360-degree video data. The encoded frame of 360-degree video data may be packed cube faces formed from a cubemap projection or equirectangular projection of a sphere of 360-degree video data.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters for sub-pixel precision. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks. Furthermore, motion compensation unit 72 may be configured to perform any or all of the techniques of this disclosure (alone or in any combination).

Inverse quantization unit 76 inverse quantizes, i.e., de-quantizes, the quantized transform coefficients provided in the bitstream and decoded by entropy decoding unit 70. The inverse quantization process may include use of a quantization parameter QPy calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation.

Deblocking unit 83 may be configured to filter block and cube face boundaries to remove blockiness artifacts from reconstructed video in accordance with the techniques described above. Deblocking unit 83 may filter the output of summer 80. Additional filters (in loop or post loop) may also be used in addition to the deblocking filter. Such filters are not shown for brevity, but if desired, may filter the output of summer 80 (as an in-loop filter).

The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1. For example, reference picture memory 82 may store decoded pictures.

Figure 22:
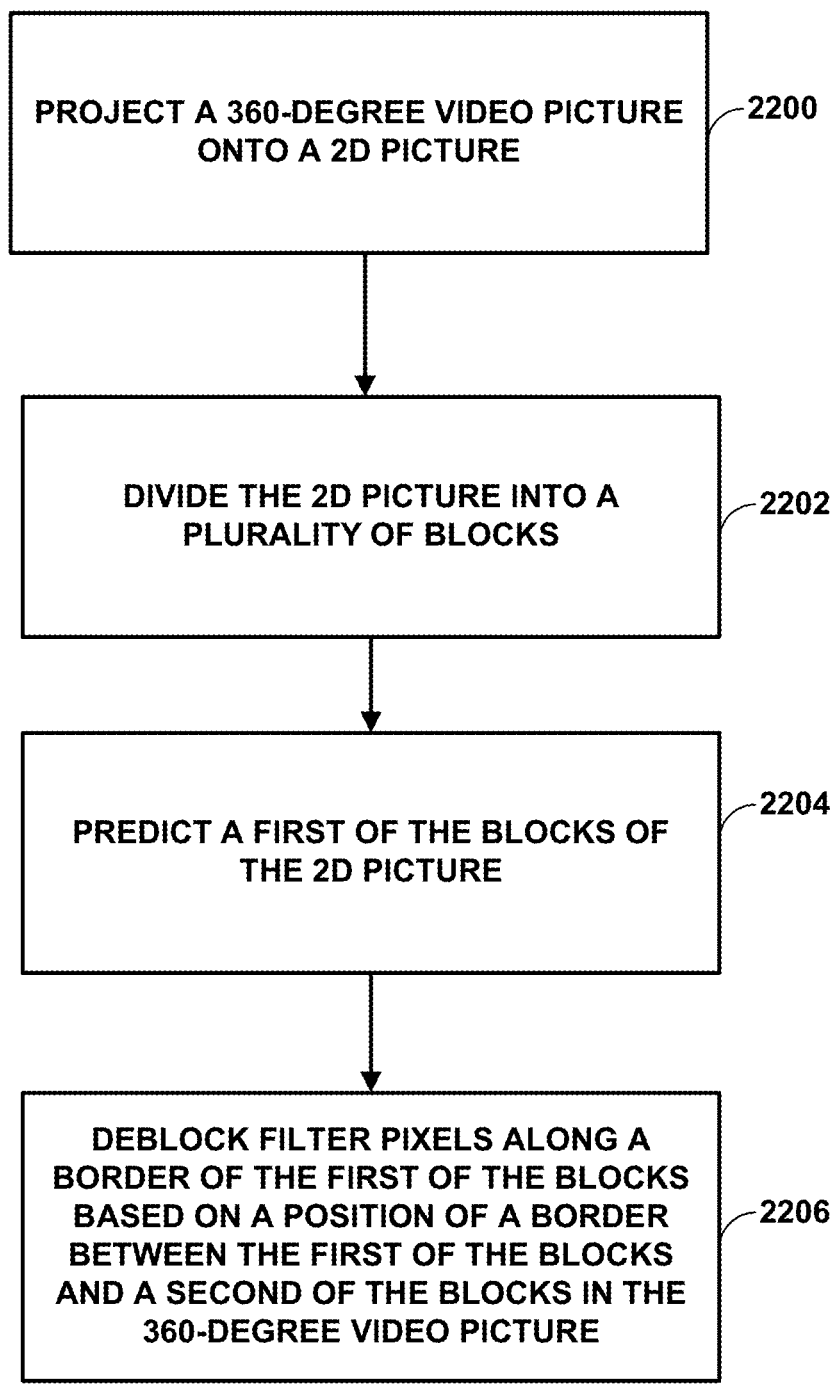
FIG. 22 is a flowchart illustrating an example encoding method of the disclosure.

FIG. 22 is a flowchart illustrating an example encoding method of the disclosure. The techniques of FIG. 22 may be performed by one or more structural components of video encoder 20.

In one example of the disclosure, video encoder 20 may be configured to project a 360-degree video picture onto a 2D picture (2200), and divide the 2D picture into a plurality of blocks (2202). Video encoder 20 may be further configured to predict a first of the blocks of the 2D picture (2204), and deblock filter pixels along a border of the first of the blocks based on a position of a border between the first of the blocks and a second of the blocks in the 360-degree video picture (2206). In some examples, video encoder 20 may be configured to deblock filter one or both of luma samples and/or chroma samples of the pixels of the 2D picture.

Figure 23:
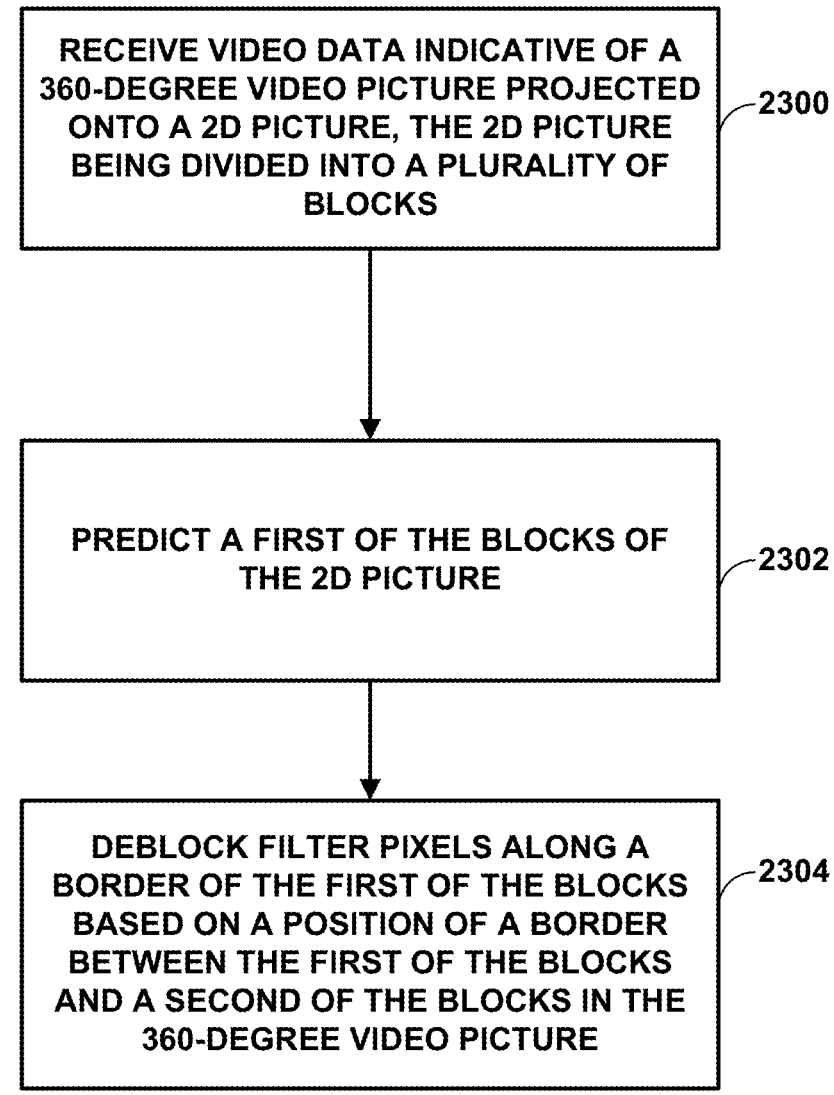
FIG. 23 is a flowchart illustrating an example decoding method of the disclosure.

FIG. 23 is a flowchart illustrating an example decoding method of the disclosure. The techniques of FIG. 23 may be performed by one or more structural components of video decoder 30.

In one example of the disclosure, video decoder 30 may be configured to receive video data indicative of a 360-degree video picture projected onto a 2D picture, the 2D picture being divided into a plurality of blocks (2300), and predict a first of the blocks of the 2D picture (2302). Video decoder 30 may be further configured to deblock filter pixels along a border of the first of the blocks based on a position of a border between the first of the blocks and a second of the blocks in the 360-degree video picture (2304). In some examples, video decoder 30 may be configured to deblock filter one or both of luma samples and/or chroma samples of the pixels of the 2D picture.

In one example of the disclosure, the deblock filtering comprises in-loop filtering of the blocks of the 2D picture to be placed in a decoded picture buffer. That is, video decoder 30 may be configured to perform the deblock filtering prior to putting the 2D picture in the decoded picture buffer.

In another example of the disclosure, deblock filtering pixels along the border of the first of the blocks based on the position of the border in the 360-degree video picture comprises determining that the first of the blocks and the second of the blocks are pairs of blocks for which the border is to be deblocked according to a particular deblocking filter that is different than for the first of the blocks and others of the blocks of the 2D picture.

In another example of the disclosure, deblock filtering pixels along the border of the first of the blocks based on the position of the border in the 360-degree video picture comprises determining a width in pixels of the filtering based on the position of the border in the 360-degree video picture. Video decoder 30 may be configured to apply the deblock filter based on the determined width.

In another example of the disclosure, deblock filtering pixels along the border of the first of the blocks based on the position of the border in the 360-degree video picture comprises determining a strength of the filtering based on the position of the border in the 360-degree video picture. Video decoder 30 may be configured to apply the deblock filter based on the determined strength.

In another example of the disclosure, the first of the blocks is at a picture border and the border is at least one of a top, bottom, left, or right border of the block.

In another example of the disclosure, deblock filtering pixels along the border of the first of the blocks based on the position of the border in the 360-degree video picture comprises determining that the first of the blocks is in one of a plurality of sections of the picture, wherein the deblock filtering is applied differently depending on the determined one of the plurality of sections.

In another example of the disclosure, the 360-degree picture is projected onto the 2D picture according to an equirectangular projection, and the sections comprise at least two sections associated with pole areas of the 360-degree video picture and at least one middle section between the two pole areas.

In another example of the disclosure, applying the deblock filtering differently depending on the determined one of the plurality of sections comprises applying one or both of a wider or stronger filter than for borders in other sections of the 360-degree video picture.

In another example of the disclosure, video decoder 30 may be further configured to determine that the second of the blocks is in a second of the plurality of sections of the picture, wherein the deblock filtering is applied differently depending on the determined first and second of the plurality of sections.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding 360-degree video, the method comprising:
receiving video data indicative of a 360-degree video picture projected onto a 2D picture, wherein the 360-degree video picture includes a plurality of faces, and wherein at least some borders of adjacent faces of the 360-degree video picture projected onto the 2D picture are not adjacent to one another in the 2D picture;
performing a prediction process on blocks of the 2D picture; and
deblock filtering pixels along a border of the 2D picture based on relative positions of the adjacent faces in the 360-degree video picture, wherein deblock filtering pixels along the border of the 2D picture uses one or both of a stronger filter or a wider filter relative to deblock filtering pixels not along the border of the 2D picture.

2. The method of claim 1, wherein the deblock filtering comprises in-loop filtering of the blocks of the 2D picture to be placed in a decoded picture buffer.

3. The method of claim 1, wherein deblock filtering pixels along the border of the 2D picture based on the relative positions of the border adjacent faces in the 360-degree video picture comprises determining a width in pixels of the filtering based on the relative positions of the border adjacent faces in the 360-degree video picture.

4. The method of claim 1, wherein deblock filtering pixels along the border of the 2D picture based on the relative positions of the adjacent faces in the 360-degree video picture comprises determining a strength of the filtering based on the relative positions of the adjacent faces in the 360-degree video picture.

5. The method of claim 1, wherein the 360-degree video picture is projected onto the 2D picture according to an equirectangular projection, and wherein the 2D picture comprises at least two sections associated with pole areas of the 360-degree video picture and at least one middle section between the two pole areas.

6. An apparatus configured to decode 360-degree video, the apparatus comprising:
a memory configured to store the 360-degree video; and
one or more processors in communication with the memory, the one or more processors configured to:
receive video data indicative of a 360-degree video picture projected onto a 2D picture, wherein the 360-degree video picture includes a plurality of faces, and wherein at least some borders of adjacent faces of the 360-degree video picture projected onto the 2D picture are not adjacent to one another in the 2D picture;
perform a prediction process on blocks of the 2D picture; and
deblock filter pixels along a border of the 2D picture based on relative positions of the adjacent faces in the 360-degree video picture, wherein deblock filtering pixels along the border of the 2D picture uses one or both of a stronger filter or a wider filter relative to deblock filtering pixels not along the border of the 2D picture.

7. The apparatus of claim 6, wherein to deblock filter, the one or more processors are further configured to in-loop filter the blocks of the 2D picture to be placed in a decoded picture buffer.

8. The apparatus of claim 6, wherein to deblock filter pixels along the border of the 2D picture based on the relative positions of the adjacent faces in the 360-degree video picture, the one or more processors are further configured to determine a width in pixels of the filtering based on the relative positions of the adjacent faces in the 360-degree video picture.

9. The apparatus of claim 6, wherein to deblock filter pixels along the border of the 2D picture based on the relative positions of the adjacent faces in the 360-degree video picture, the one or more processors are further configured to determine a strength of the filtering based on the relative positions of the adjacent faces in the 360-degree video picture.

10. The apparatus of claim 6, wherein the 360-degree video picture is projected onto the 2D picture according to an equirectangular projection, and wherein the 2D picture comprises at least two sections associated with pole areas of the 360-degree video picture and at least one middle section between the two pole areas.

11. A method of encoding 360-degree video, comprising:
projecting a 360-degree video picture onto a 2D picture, wherein the 360-degree video picture includes a plurality of faces, and wherein at least some borders of adjacent faces of the 360-degree video picture projected onto the 2D picture are not adjacent to one another in the 2D picture;
dividing the 2D picture into a plurality of blocks;
performing a prediction process on blocks of the 2D picture; and
deblock filtering pixels along a border of the 2D picture based on relative positions of the adjacent faces in the 360-degree video picture, wherein deblock filtering pixels along the border of the 2D picture uses one or both of a stronger filter or a wider filter relative to deblock filtering pixels not along the border of the 2D picture.

12. A non-transitory computer-readable storage medium storing instructions that, when executed, causes one or more processors of a device configured to decode video data to:
receive video data indicative of a 360-degree video picture projected onto a 2D picture, wherein the 360-degree video picture includes a plurality of faces, and wherein at least some borders of adjacent faces of the 360-degree video picture projected onto the 2D picture are not adjacent to one another in the 2D picture;
perform a prediction process on blocks of the 2D picture; and
deblock filter pixels along a border of the 2D picture based on relative positions of the adjacent faces in the 360-degree video picture, wherein deblock filtering pixels along the border of the 2D picture uses one or both of a stronger filter or a wider filter relative to deblock filtering pixels not along the border of the 2D picture.

* * * * *